United States Patent
Koganehira et al.

(10) Patent No.: US 9,039,823 B2
(45) Date of Patent: May 26, 2015

(54) COATING LIQUID FOR INK JET AND INK JET RECORDING METHOD USING THE SAME

(75) Inventors: Shuichi Koganehira, Matsumoto (JP); Shinichi Yamamoto, Matsumoto (JP)

(73) Assignee: Seiko Epson Corporation, Suwa-shi (JP)

( * ) Notice: Subject to any disclaimer, the term of this patent is extended or adjusted under 35 U.S.C. 154(b) by 159 days.

(21) Appl. No.: 13/557,557

(22) Filed: Jul. 25, 2012

(65) Prior Publication Data

US 2013/0029045 A1 Jan. 31, 2013

(30) Foreign Application Priority Data

Jul. 29, 2011 (JP) ................. 2011-167023

(51) Int. Cl.
| C09D 11/033 | (2014.01) |
| C09D 139/04 | (2006.01) |
| B41J 2/135 | (2006.01) |
| C09D 137/00 | (2006.01) |
| B41M 5/00 | (2006.01) |
| C08L 83/04 | (2006.01) |

(52) U.S. Cl.
CPC .......... C09D 137/00 (2013.01); B41M 5/0011 (2013.01); C08L 83/04 (2013.01)

(58) Field of Classification Search
None
See application file for complete search history.

(56) References Cited

U.S. PATENT DOCUMENTS

| 7,524,892 B2 * | 4/2009 | Kataoka et al. .............. 523/160 |
| 2006/0196390 A1 | 9/2006 | Rehman et al. |
| 2009/0112682 A1 * | 4/2009 | Demsky et al. .................. 705/9 |
| 2010/0087595 A1 * | 4/2010 | Koganehira et al. .......... 524/612 |
| 2010/0295891 A1 | 11/2010 | Goto et al. |
| 2013/0321524 A1 * | 12/2013 | Katsuragi ...................... 347/21 |

FOREIGN PATENT DOCUMENTS

| JP | 2002-137376 | * | 5/2002 |
| JP | 2003-213179 A | | 7/2003 |
| JP | 2003-253167 | * | 9/2003 |
| JP | 2003-253167 A | | 9/2003 |
| JP | 2005-194500 A | | 7/2005 |
| JP | 2006-249429 A | | 9/2006 |
| JP | 2009-166387 A | | 7/2009 |
| JP | 2010-131779 A | | 6/2010 |
| JP | 2010-137440 A | | 6/2010 |

OTHER PUBLICATIONS

Machine-generated translation of JP 2002-137376 into English (no date).*
STN registry data for BYK 348 (no date).*
STN registry data for Epocros K 1030 (no date).*

* cited by examiner

*Primary Examiner* — Marc Zimmer
(74) *Attorney, Agent, or Firm* — Nutter McClennen & Fish LLP; John J. Penny, Jr.

(57) ABSTRACT

A coating liquid comprising: an oxazoline group-containing resin; an alkanediol having 7 or more carbon atoms; a surfactant; and water.

17 Claims, 3 Drawing Sheets

COATING LIQUID FOR INK JET AND INK JET RECORDING METHOD USING THE SAME

The entire disclosure of Japanese Application No.: 2011-167023 filed on Jul. 29, 2011 is expressly incorporated by reference herein.

BACKGROUND

1. Technical Field

The present invention relates to a coating liquid for ink jet and an ink jet recording method using the same.

2. Related Art

Ink jet recording methods are recording methods in which ink droplets are ejected and adhered on recording media such as paper to perform recording. Due to recent innovative advancement in ink jet recording technologies, ink jet recording methods are being increasingly employed in the fields of high-definition printing that have been realized by silver halide photos and off-set printing heretofore. With this advancement, inks for ink jet recording have been developed, which can realize image with gloss comparable to silver halide photos by ink jet recording using highly glossy recording media, i.e., special paper, comparable to the developing paper, art paper, and the like that have been used in the fields of silver halide photos and off-set printing. Moreover, inks for ink jet recording that can achieve image quality comparable to silver halide photos even when normal paper is used have also been developed.

Due to recent spread of image-forming technologies involving digital data, desk top publishing (DTP) has become popular in the fields of printing in particular. Even when recording is performed through DTP, a proof for correcting color is produced beforehand to confirm the gloss and color of actual recorded materials. Ink jet recording systems are being applied to outputting of such proofs. In DTP, high color reproductivity and high stability of the recorded materials are required, and therefore, special paper for ink jet recording is usually used as recording media.

Proof paper, which is special paper for ink jet recording, is prepared such that a print made therefrom has the same gloss and color as those of an actually output print on print paper. As such, the quality and material for special paper are appropriately adjusted according to the type of print paper but making special paper that is compatible with many types of print paper increases the production costs of print paper. Thus, for color proof usage, it is desirable from the technical viewpoint if ink jet recording can be performed on print paper rather than special paper. If samples made by performing ink jet recording directly on print paper without using special paper can be used as the final proof samples, possibly, the cost for proofing can be dramatically reduced from the economic viewpoint. Moreover, synthetic paper prepared by mixing inorganic fillers and the like with polyethylene resins or polyester resins and forming the resulting mixtures into films is widely used in the field of printing and is attracting attention as environmentally friendly products that have high recyclability. Thus, it is desirable from the environmental viewpoint if recording can be conducted on such synthetic paper.

Print paper is coated paper having a coating layer for receiving oil-based inks on its surface and is characterized in that the coating layer has poor ink-absorbing capability for aqueous inks. Thus, when aqueous pigmented inks commonly used in the ink jet recording are used, the inks exhibit low permeability into the recording medium (print paper), and bleeding, or aggregation unevenness or streak unevenness may occur in the images in some cases. As for these problems, addition of various components to inks is disclosed in JP-A-2005-194500, JP-A-2003-213179, JP-A-2003-253167, and JP-A-2006-249429.

However, in the case where the ink described in the Patent Documents above is used to record a color image on a low-ink-absorbing recording medium, in which the ink is a water-based ink, such as print paper, aggregation unevenness, streak unevenness, or the like may occur in color images on some occasions. Particularly, with non-ink-absorbing recording media having lower absorbency to a water-based ink than print paper (for example, plastic films made of a vinyl chloride resin or a polyester resin, and fabrics made of a vinyl chloride resin fibers or a polyester resin fibers), the problems as above may occur noticeably in some cases.

Regarding these problems, it can be considered, for example, that a receiving layer for receiving water-based inks may be provided on a non-ink-absorbing or low-ink-absorbing recording medium. Using a resin as the receiving layer can be considered, but depending on the type of the resin, the ink receivability cannot be satisfied in some cases. As for this problem, increasing the amount of the coating liquid to be attached on the recording medium can be considered.

However, with an ink jet recording system, when a coating liquid for forming a receiving layer is used to form a receiving layer, in a similar manner to water-based inks, the same problems as with the water-based inks, such as aggregation unevenness and streak unevenness, may occur in some cases, and this becomes noticeable particularly when the amount of the coating liquid to be attached to the recording medium increases. In the case where aggregation unevenness or streak unevenness occurs, the thickness of the receiving layer becomes non-uniform, and a region having a thin receiving layer has poorer ink receivability than a region having a thick receiving layer.

Furthermore, even though the aggregation unevenness or streak unevenness can be inhibited to form a receiving layer having sufficient ink receivability, water resistance of the image formed on the receiving layer is lowered, and thus, another problem that a good color image cannot be formed may occur in some cases.

SUMMARY

An advantage of some aspects of the invention is to provide a coating liquid for ink jet, with which occurrence of aggregation unevenness and streak unevenness is low and the ink receivability is good.

The invention can be realized in the following forms or application examples.

APPLICATION EXAMPLE 1

According to Application Example 1, there is provided a coating liquid for ink jet, including an oxazoline group-containing resin, an alkanediol having 7 or more carbon atoms, a surfactant, and water.

According to the coating liquid described in Application Example 1, occurrence of aggregation unevenness and streak unevenness is low, and thus a coating layer having good ink receivability may be formed.

APPLICATION EXAMPLE 2

In the coating liquid according to Application Example 1, the weight average molecular weight of the oxazoline group-containing resin may be from 20000 to 120000.

APPLICATION EXAMPLE 3

In the coating liquid according to Application Example 1 or 2, the carboxyl group-containing resin may be further included.

APPLICATION EXAMPLE 4

In the coating liquid according to Application Example 3, the ratio (MA/MB) of the number of moles (MA) of oxazoline groups in the total mass of the oxazoline group-containing resin to the number of moles (MB) of carboxyl groups in the total mass of the carboxyl group-containing resin may be from 10 to 40.

APPLICATION EXAMPLE 5

In the coating liquid according to any one of Application Examples 1 to 4, the alkanediol having 7 or more carbon atoms may be at least one selected from the group consisting of 1,2-heptanediol, 1,2-octanediol, 4,4-dimethyl-1,2-pentanediol, 5-methyl-1,2-hexanediol, and 4-methyl-1,2-hexanediol.

APPLICATION EXAMPLE 6

In the coating liquid according to any one of Application Examples 1 to 5, the surfactant may be at least one of a polyorganosiloxane-based surfactant and a fluorine-based surfactant.

APPLICATION EXAMPLE 7

In the coating liquid according to any one of Application Examples 1 to 6, at least one of oxyalkylene glycols and glycol ethers may be further included.

APPLICATION EXAMPLE 8

According to Application Example 8, there is provided an ink jet recording method using an ink jet recording apparatus having a head, in which the head is equipped with nozzle rows including a plurality of nozzle holes, the method including discharging liquid droplets of the coating liquid described in any one of Application Examples 1 to 7 from the nozzle holes, attaching the liquid droplets onto a recording medium to form dots including the liquid droplets, and repeating the discharging and the attaching plural times to form a coating layer on the recording medium.

According to the ink jet recording method described in Application Example 8, occurrence of aggregation unevenness and streak unevenness is low, and thus, a coating layer having good ink receivability may be formed.

APPLICATION EXAMPLE 9

In the ink jet recording method according to Application Example 8, the a plurality of nozzle rows may be aligned, the coating layer formed in the repeating may have a dot interval with an image resolution of 300 dpi or more in the alignment direction of the nozzle rows, the mass of the liquid droplets discharged in the discharging may be from 1 ng to 15 ng, and the diameter of the dots formed in the attaching may be larger than the dot interval.

APPLICATION EXAMPLE 10

In the ink jet recording method according to Application Example 8 or 9, discharging liquid droplets of a color ink composition including a colorant and water from the nozzle holes, and attaching the liquid droplets onto the coating layer to form a color image may be further included.

APPLICATION EXAMPLE 11

In the ink jet recording method according to any one of Application Examples 8 to 10, drying the recording medium may be further included.

APPLICATION EXAMPLE 12

In the ink jet recording method according to any one of Application Examples 8 to 11, the coating layer may be formed on the entire surface of the recording medium in the repeating.

APPLICATION EXAMPLE 13

In the ink jet recording method according to any one of Application Examples 8 to 12, the recording medium may be a low-ink-absorbing or non-ink-absorbing recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
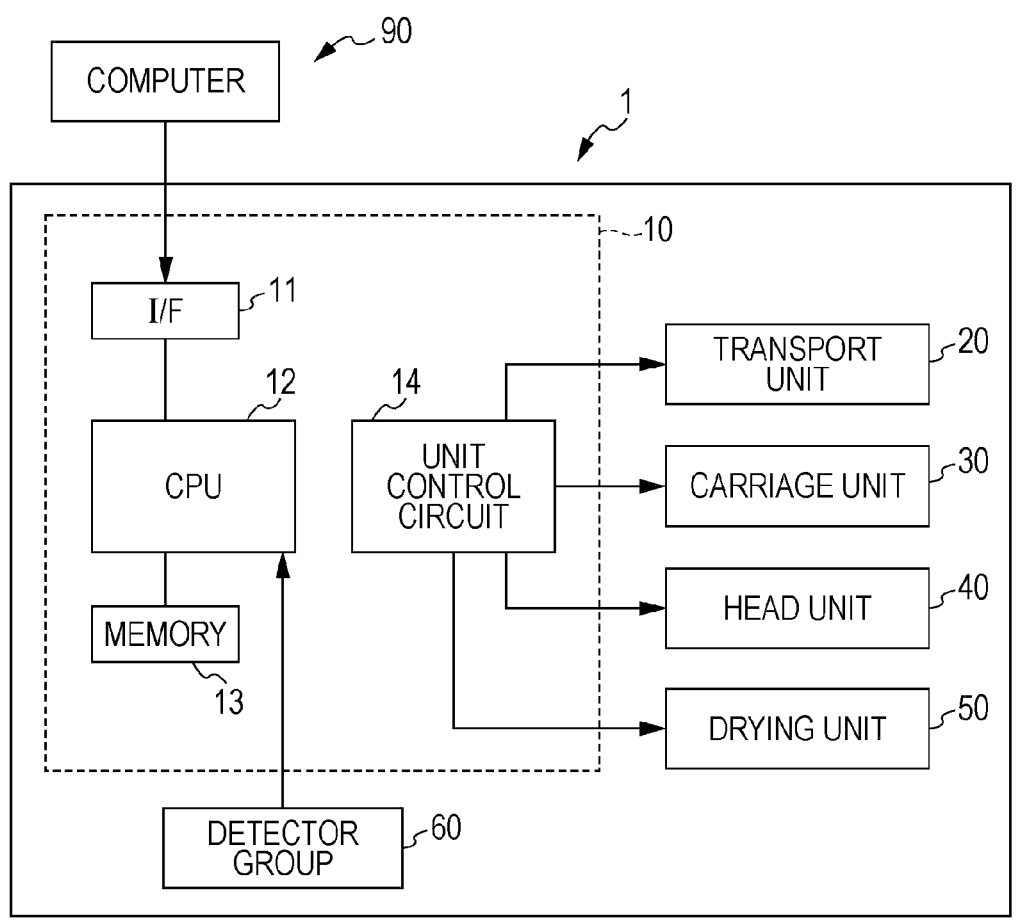
FIG. 1 is a block diagram showing a recording system having the recording apparatus according to an embodiment of the invention.

Suitable embodiments of the invention will be described below. The embodiments described below will illustrate single examples of the invention. Further, the invention is not limited to the following embodiments, but includes various Modification Examples carried out within a scope not departing from the spirit of the invention.

1. Coating Liquid for Ink Jet

The coating liquid for ink jet according to one embodiment of the invention contains an oxazoline group-containing resin, an alkanediol having 7 or more carbon atoms, a surfactant, and water.

The coating liquid for ink jet according to the present embodiment (which will be hereinafter simply referred to as a "coating liquid") is attached onto a recording medium to form a coating layer as described later. The coating layer formed by the coating liquid functions as a layer receiving the ink discharged on the coating layer. Hereinafter, the components contained in the coating liquid will be described in detail.

1.1. Oxazoline Group-Containing Resin

The coating liquid according to the present embodiment contains an oxazoline group-containing resin. Examples of the functions of the oxazoline group-containing resin include improving the water resistance of a coating layer formed by a coating liquid, enhancing the receivability of the ink discharged onto the coating layer, and improving the water resistance of an image formed by the ink discharged onto the coating layer.

Particularly, the oxazoline group in the oxazoline group-containing resin is easily reacted with a carboxyl group to form a crosslinked structure. As a result, for example, when components having carboxyl groups (for example, those having carboxyl groups in the structure in a resin dispersant as described later) is added to the coating liquid, the water resistance of the coating layer is further improved.

Examples of the oxazoline group-containing resin include those having oxazoline groups on the side chains of the main chain with the main chain being an acryl skeleton or styrene-acryl skeleton. Among these, an oxazoline group-containing acryl resin having an acryl skeleton as a main chain and an oxazoline group as a side chain is preferred. The oxazoline group-containing resins may be used alone or in combination of two or more kinds thereof.

Examples of the oxazoline group include a 2-oxazoline group, a 3-oxazoline group, and a 4-oxazoline group. Among these, a 2-oxazoline group is preferred. The 2-oxazoline group is represented by the following general formula (1).

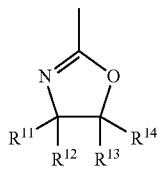

(1)

(in general formula (1), $R^{11}$, $R^{12}$, $R^{13}$, and $R^{14}$ each independently represent a hydrogen atom, a halogen atom, an alkyl group, an aralkyl group, a phenyl group, or a substituted phenyl group).

The weight average molecular weight of the oxazoline group-containing resin is preferably from 20000 to 120000, and more preferably from 20000 to 80000. When the weight average molecular weight of the oxazoline group-containing resin is within the above-described ranges, particularly when it does not exceed the upper limits, the oxazoline group-containing resin is easily dissolved in a solvent (water) of the coating liquid. Thus, the surface of the coating layer can be smoothened, and thus, a coating layer having good glossiness can be obtained. The weight average molecular weight of the oxazoline group-containing resin can be determined in accordance to, for example, the molecular weight in terms of polystyrene, as measured by means of gel permeation chromatography (GPC) using tetrahydrofuran as a solvent.

The oxazoline group-containing resin can be used in an emulsion type in which the resins are emulsified and dispersed in water or in an aqueous solution type in which the resins are dissolved in water. Among these, it is preferable that the oxazoline group-containing resin be used in the aqueous solution type. The oxazoline group-containing resin in the aqueous solution type has a lower weight average molecular weight than the oxazoline group-containing resin in the emulsion type. Accordingly, the surface of the coating layer can be smoothened and a coating layer having good glossiness can be obtained.

As the oxazoline group-containing resin, commercially available products can be used, and specific examples thereof include, as water-soluble type ones, oxazoline group-containing acryl resins such as Epocros WS-300 [main chain: acryl-based, weight average molecular weight: 120000, amount of oxazoline groups: 7.7 mmol/g (in terms of solid content), solid content: 10%], Epocros WS-500 [main chain: acryl-based, weight average molecular weight: 70000, amount of oxazoline groups: 4.5 mmol/g (in terms of solid content), solid content: 39%], and Epocros WS-700 [main chain: acryl-based, weight average molecular weight: 40000, amount of oxazoline groups: 4.5 mmol/g (in terms of solid content), solid content 25%]. Further, examples of the emulsion types include oxazoline group-containing styrene-acryl resins such as Epocros K-2010E [main chain: styrene-acryl, amount of oxazoline groups: 1.8 mmol/g (in terms of solid content), solid content: 40%], Epocros K-2020E [main chain: styrene-acryl, amount of oxazoline groups: 1.8 mmol/g (in terms of solid content), solid content: 40%], and Epocros K-2030E [main chain: styrene-acryl, amount of oxazoline groups: 1.8 mmol/g (in terms of solid content), solid content: 40%].

The content of the oxazoline group-containing resin is preferably from 5% by mass to 20% by mass, and more preferably from 8% by mass to 18% by mass, in terms of solid content, with respect to the total mass of the coating liquid. When the content of the oxazoline group-containing resin is within the above-described ranges, the action of the coating layer receiving the ink can be further improved in some cases.

1.2. Alkanediol Having 7 or More Carbon Atoms

The coating liquid according to the present embodiment contains an alkanediol having 7 or more carbon atoms. One of the functions of the alkanediol having 7 or more carbon atoms is a surfactant effect. That is, the interfacial tension between the coating liquid and the low-ink-absorbing or non-ink-absorbing recording medium is suitably lowered to increase the contact area between the liquid droplets and the recording medium. Thus, the fixability of the liquid droplets on the recording medium can be enhanced. On the other hand, one of the functions of the alkanediol having 7 or more carbon atoms is an effect of inhibiting the flow of the liquid droplets. That is, the alkanediol having 7 or more carbon atoms is a liquid having high viscosity or a solid due to its above-described characteristics of inclusion of 7 or more carbon atoms. Accordingly, after the liquid droplets of the coating liquid are attached on the recording medium, it is difficult for the liquid droplets to flow, and accordingly, occurrence of aggregation unevenness or streak unevenness can be reduced and the fixability on the recording medium can be enhanced.

In the present specification, the aggregation unevenness means a local concentration plaque that occurs when a coating layer is formed using a coating liquid, and is a phenomenon observed as non-uniform film thickness of the solid components (resin components or coloring material components). It does not mean that portions having the surface of the recording medium not coated with the coating liquid remain. The aggregation unevenness occurs because liquid droplets flow on the recording medium and are brought into contact with other liquid droplets.

Furthermore, in the present specification, the streak unevenness means a phenomenon that the portion not coated with the coating liquid in the surface of the recording medium remains in the streaks due to inferior filling of the liquid droplets of the coating liquid. The streak unevenness occurs because the flow of the liquid droplets discharged onto the recording medium (flow from the position at which the liquid droplets should be fixed) or the contact area of the liquid droplets with respect to the recording medium is small and "repelled".

In addition, in the present specification, the fixability means a property that the liquid droplets remain in the position at which they should be fixed. If the liquid droplets flow from the position at which they should be fixed (inferior fixability), in particular, when the liquid droplets are recorded in a high Duty, the aggregation unevenness or streak unevenness easily occurs.

The alkanediol having 7 or more carbon atoms more preferably has 7 to 10 carbon atoms, and it is still more preferably a 1,2-alkanediol having 7 to 10 carbon atoms. Further, in the invention, the hydrocarbon group moiety of the alkanediol may be either linear or branched chain.

Examples of the alkanediol having 7 or more carbon atoms include 1,2-heptanediol, 1,2-octanediol, 4,4-dimethyl-1,2-pentanediol, 5-methyl-1,2-hexanediol, and 4-methyl-1,2-hexanediol, and among these, 1,2-octanediol is more preferred.

The content of the alkanediol having 7 or more carbon atoms is appropriately determined as long as the fixability of the liquid droplets of the coating liquid can be obtained, but it is preferably from 1% by mass to 5% by mass, more preferably from 1% by mass to 4% by mass, and still more preferably from 1% by mass to 3% by mass, with respect to the total mass of the coating liquid. When the amount of the alkanediol having 7 or more carbon atoms is within the above-described ranges, particularly when it is not below the lower limit, the fixability of the liquid droplets is favorable. Further, when the amount of the poor water-soluble alkanediol is within the above-described ranges, particularly when it does not exceed the upper limit, the initial viscosity of the coating liquid is not too high, and in an ordinary storage state of the coating liquid, separation of the oil layer (for example, alkanediols having 7 or more carbon atoms) can be inhibited, which is preferable from the viewpoint of storability of the coating liquid.

1.3. Surfactant

The coating liquid according to the present embodiment contains a surfactant. When a surfactant is used, bleeding can be controlled, and therefore, an image excellent in expressing thin lines can be formed on a recording medium having a surface of a fiber layer for receiving ink, such as normal paper. Particularly, even when a low-ink-absorbing or non-ink-absorbing recording medium or the like is used, the liquid droplets of the coating liquid easily wet and are dispersed in the recording medium, leading to good fixability of the liquid droplets, and therefore, occurrence of aggregation unevenness or occurrence of streak unevenness can be reduced.

Furthermore, when the surfactant is combined with the above-described alkanediol having 7 or more carbon atoms, it functions synergically, leading to better fixability of the liquid droplets, and therefore, occurrence of aggregation unevenness or streak unevenness can be effectively inhibited.

A polyorganosiloxane-based surfactant can be suitably used as the surfactant, and when a coating layer is formed, the wettability with respect to the surface of the recording medium as well as the permeability into the coating liquid can also be enhanced.

Commercially available products may be used as the polyorganosiloxane-based surfactant, and, for example, BYK-347 (manufactured by BYK Chemie), BYK-348 (manufactured by BYK Chemie), BYK-349 (manufactured by BYK Chemie), BYK-3550 (manufactured by BYK Chemie), and BYK-UV3510 (manufactured by BYK Chemie) can be used.

The polyorganosiloxane-based surfactant is not particularly limited, but a polyorganosiloxane-based surfactant which has a dynamic surface tension of 26 mN/m or less at 1 Hz when prepared in an aqueous solution containing 20% by mass of glycerin, 10% by mass of 1,2-hexanediol, 0.1% by mass of the polyorganosiloxane-based surfactant, and 69.9% by mass of water is preferred, from the viewpoint of further improving the fixability of the liquid droplets. The dynamic surface tension can be measured using, for example, a bubble pressure tensiometer BP2 (manufactured by KRUS GmbH).

Commercially available surfactants may also be used as the surfactant. For example, Olfine PD-501 and Olfine PD-570 (both manufactured by Nissin Chemical Industry Co., Ltd.) can be used.

Furthermore, specific examples of the polyorganosiloxane-based surfactant may include one or more of compounds represented by the following general formula (2).

Further, one or more of the compounds of the following general formula (2), in which R represents a hydrogen atom or a methyl group, a represents an integer of 2 to 11, m represents an integer of 2 to 50, and n represents an integer of 1 to 5, are preferably included, and one or more of the compounds of the following general formula (2), in which R is a hydrogen atom or a methyl group, a is an integer of 2 to 13, m is an integer of 2 to 50, and n is an integer of 1 to 5, are more preferably included.

Furthermore, one or more of the compounds of the following general formula (2), in which R is a hydrogen atom or a methyl group, a is an integer of 2 to 13, m is an integer of 2 to 50, and n is an integer of 1 to 8, are still more preferably included.

Alternatively, one or more of the compounds of the following formula (2), in which R is a methyl group, a is an integer of 6 to 18, m is 0 to 4, and n is 1 or 2, are preferably included, or one or more of the compounds of the following formula (2), in which R is a methyl group, a is an integer of 6 to 18, m is 0, and n is 1, are more preferably included. By using the specific polyorganosiloxane-based surfactant, even when recording is performed on a non-ink-absorbing or low-ink-absorbing recording medium as a recording medium, the aggregation unevenness on the recording medium is further improved.

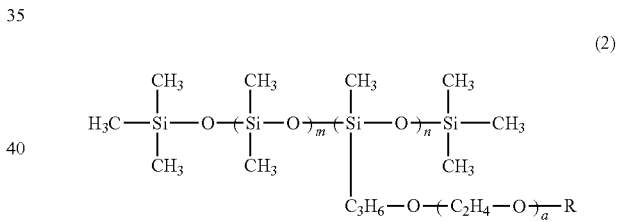

(2)

(in which R represents a hydrogen atom or a methyl group, a represents an integer of 2 to 18, m represents an integer of 0 to 70, and n represents an integer of 1 to 8).

By using the compound of the general formula (2), in which R is a methyl group, the aggregation unevenness may be further improved in some cases. Further, by using the compound of formula (2), in which R is a hydrogen atom, in combination, the streak unevenness may be further improved in some cases.

By suitably adjusting the blending ratio of the compound of the general formula (2), in which R is a methyl group, and the compound of the general formula (2), in which R is a hydrogen atom, a high-quality coating layer having further improved aggregation unevenness and streak unevenness can be obtained, and the compounds are effective as an adjuster in the case where the flowability varies depending on the amount of the resin.

The polyorganosiloxane-based surfactant is preferably contained in the amount of 0.01 to 1.0% by mass, and more preferably in the amount of 0.05 to 0.50% by mass, with respect to the total mass of the coating liquid. Particularly, in the case where the surfactant, in which R in formula (2) is a hydrogen group, is used, reduction in the content is more preferred from the viewpoint of the aggregation unevenness, as compared with a case where the surfactant, in which R in formula (2) is a methyl group, is used. By incorporating the surfactant, in which R in formula (2) is a hydrogen group, in the amount of 0.01 to 0.1% by mass, water repellency is exhibited and thus, the bleeding can be adjusted.

As the surfactant, a fluorine-based surfactant can be suitably used, and the wettability with respect to the surface of the recording medium when forming the coating layer is increased, and thus, the permeability of the ink can be increased.

As the fluorine-based surfactant, commercially available products may be used, and for example, ZONYL series (manufactured by E.I. du Pont de Nemours & Company Inc.), FLUORAD series (manufactured by Sumitomo 3M Limited), and FTERGENT series (manufactured by Neos Co., Ltd.) can be used.

Specifically, examples of the ZONYL series of fluorine-based surfactants include $(R_fCH_2CH_2O)_xPO(O-NH^{4+})_y$ (trade name "ZONYL FSP"), $R_fCH_2CH_2SO_3H$ (trade name "ZONYL FSJ"), $R_fCH_2CH_2SO_3^{-}NH^{4+}$ (trade name "ZONYL TBS"). $C_6F_{13}CH_2CH_2SO_3H$, $C_6F_{13}CH_2CH_2SO_3^{-}NH^{4+}$ (trade name "ZONYL FS-62"). $R_fCH_2CH_2SCH_2CH_2COO^{-}Li^+$ (trade name "ZONYL FSA"). $R_fCH_2CH_2O(CH_2CH_2O)_xH$ (trade name "ZONYL FSO"), and $R_fCH_2CH_2O(CH_2CH_2O)_yH$ (trade name "ZONYL FSN").

Further, in the structural formulae exemplified as the ZONYL series, x and y are integers satisfying x+y=3, $R_f$ is $F(CF_2CF_2)_z$, and z is 1 to 7 for FSP, FSJ and FSO and 1 to 9 for TBS and FSA.

Furthermore, examples of the FLUORAD series of the fluorine-based surfactants include ammonium perfluoroalkylsulfonate (trade name "FC-120"), fluorinated potassium alkylcarboxylate (trade name "FC-129"), fluorinated alkylpolyoxyethyleneethanol (trade name "FC-170C"), fluorinated alkyl alkoxylate (trade name "FC-171"), and fluorinated alkyl ether (trade name "FC-430", "FC-431", "FC-470").

In addition, the FTERGENT series of the fluorine-based surfactants includes those having double bonds in the molecules and having complicated branched perfluoroalkenyl structures, and examples thereof include sulfonates (trade name "FTERGENT 100, 100C, and 110"), carboxylates (trade name "FTERGENT 150, 150CH, A-K, and 501"), polyoxyethylenes (trade name "FTERGENT 250, 251, 222F, and 208G"), quaternary ammonium salts (trade name "FTERGENT 300 and 310"), and betaine (trade name "FTERGENT 400SW").

Among the fluorine-based surfactants as described above, 251 and 208G are preferred, and FTERGENT 251 is more preferred. The fluorine-based surfactants may be used alone or in combination of two or more kinds thereof. FTERGENT 251 and 208G have a dynamic surface tension of 26 mN/m or less at 1 Hz when prepared in an aqueous solution containing 20% by mass of glycerin, 10% by mass of 1,2-hexanediol, 0.1% by mass of the fluorine-based surfactant, and 69.9% by mass of water, and therefore, it is preferred from the viewpoint of increasing the wettability with respect to the surface of the recording medium (contact area).

The fluorine-based surfactant is preferably contained in the amount of 0.01 to 1.0% by mass, and more preferably 0.05 to 0.50% by mass with respect to the total mass of the coating liquid.

To the coating liquid according to the present embodiment, another surfactant, specifically, an acetylene glycol-based surfactant, an anionic surfactant, a nonionic surfactant, an ampholytic surfactant, or the like may be further added.

Among these, examples of the acetylene glycol-based surfactant include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Further, commercially available products may also be used as the acetylene glycol-based surfactant, and examples thereof include Olfine E1010, STG, and Y (trade names, manufactured by Nissin Chemical Industry Co., Ltd.), and Surfinol 61, 104, 82, 465, 485, and TG (trade names, manufactured by Air Products and Chemicals Inc.).

1.4. Water

The coating liquid according to the present embodiment contains water. As the water, pure water or ultrapure water such as deionized water, ultra-filtered water, reverse osmosis water, and distilled water is preferably used. Any one of such kinds of water, which are sterilized by ultraviolet irradiation, hydrogen peroxide addition, or the like, is preferably used since generation of mold and bacteria can be prevented over a long period of time.

1.5. Additional Components

The coating liquid according to the present embodiment preferably further contains components other than the components described above. The components that may be added to the coating liquid according to the present embodiment will be described below.

1.5.1. Carboxyl Group-Containing Resin

The coating liquid according to the present embodiment may contain a carboxyl group-containing resin. The carboxyl group-containing resin refers to a compound having a carboxyl group in the structural skeleton.

The carboxyl group-containing resin can undergo a crosslinking reaction with an oxazoline group in the above-described oxazoline group-containing resin (formation of an amide ester bond). Thus, the water resistance in the coating layer can be noticeably improved.

In the coating liquid according to the present embodiment, the ratio (MA/MB) of the number of moles (MA) of oxazoline groups in the total mass of the oxazoline group-containing resin to the number of moles (MB) of carboxyl groups in the total mass of the carboxyl group-containing resin is preferably from 10 to 40, and more preferably from 15 to 30. When the ratio (MA/MB) is within the above-described ranges, the water resistance of the coating layer may be further improved in some cases.

On the other hand, from the viewpoints of the water resistance involving the coating layer and the color image as described later, the ratio (MA/MB) is preferably from 15 to 40. Particularly, in the case where the components having carboxyl groups in the color ink composition as described later are included, if the ratio (MA/MB) is within the above-described ranges, the components can be sufficiently reacted with the oxazoline groups contained in the coating layer, and thus, the water resistance of the obtained color image may be further improved in some cases.

Herein, the number of moles (MA) of oxazoline groups in the total mass of the oxazoline group-containing resin added to the coating liquid is calculated by the following formula (3).

$$MA = [\text{Amount (mmol/g) of oxazoline groups per gram of oxazoline group-containing resin (in terms of solid content)}] \times [\text{Content (g) of the oxazoline group-containing resin in the coating liquid in terms of solid content}] \quad (3)$$

Furthermore, the number of moles (MB) of carboxyl groups in the total mass of the carboxyl group-containing resin added to the coating liquid is calculated by the following formula (4).

$$MB = [\{\text{Acid value of carboxyl group-containing resin/neutralizing acid value in terms of KOH}\}(\text{mmol/g})]\text{Amount (g) of the carboxyl group-containing resin in the coating liquid in terms of solid content}] \quad (4)$$

(Further, in formula (4), the neutralizing acid value in terms of KOH is 56.1).

The carboxyl group-containing resin is not particularly limited as long as it has a carboxyl group in the structural skeleton, but examples thereof include compounds having carboxyl groups in the urethane resins and the fluorene skeleton-containing resins exemplified as a dispersant as described later. Among these, the fluorene skeleton-containing resins having carboxyl groups can be preferably used from the viewpoints of inhibiting the separation of the alkanediols having 7 or more carbon atoms in the coating liquid.

The carboxyl group in the carboxyl group-containing resin may be neutralized from the viewpoint of storage stability of the coating liquid. Neutralization of the carboxyl group can be carried out using a neutralizing agent (for example, organic amines, ammonia, sodium hydroxide, and potassium hydroxide). The organic amines used as the neutralizing agent are preferably monoamines having 3 or more carbon atoms, and more preferably tertiary monoamines having 3 to 12 carbon atoms. Specific examples of the organic amines include aliphatic primary amines such as 2-amino-2-hydroxymethyl-1,3-propanediol, and aliphatic tertiary amines such as trimethylamine, triethylamine, triethanolamine, N-methyldiethanolamine, and N,N-dimethylethanolamine, and alicyclic amines such as hexahydro-1,3,5-triazine, 1,3,5-tris(2-hydroxyethyl)-hexahydro-1,3,5-triazine.

The addition amount of the neutralizing agent may be appropriately determined, but it is preferably from about 0.1 to 5.0% by mass, and more preferably from 0.1 to 2.0% by mass, with respect to the total mass of the ink. Within the above-described ranges, a coating liquid having excellent storage stability can be obtained.

1.5.2. (Poly)Oxyalkylene Glycol

The coating liquid according to the present embodiment may contain a (poly)oxyalkylene glycol.

The (poly)oxyalkylene glycol can be preferably obtained by addition polymerization of ethylene oxide and/or propylene oxide. According to a preferred embodiment of the invention, it is more preferably one or more selected from the group consisting of ethylene glycol, diethylene glycol, triethylene glycol, propylene glycol, dipropylene glycol, and tripropylene glycol, and more preferably one or more selected from the group consisting of triethylene glycol, propylene glycol, dipropylene glycol, and tripropylene glycol. According to a preferred embodiment of the invention, the (poly)oxyalkylene glycol is more preferably (poly)propylene glycol. The (poly)propylene glycol is not particularly limited, but it is more preferably tripropylene glycol (CAS No. 24800-44-0) from the viewpoint of lower moisture absorbency.

The (poly)oxyalkylene glycol may be appropriately determined as long as it can inhibit the aggregation unevenness and streak unevenness of the coating liquid with good efficiency, but it is preferably contained in the amount of 2.0 to 18.0% by mass, and more preferably 2.0 to 6.0% by mass, with the respect to the total mass of the coating liquid. When the amount of the (poly)oxyalkylene glycol is within the above-described ranges, particularly when it is not lower than the lower limit, the (poly)oxyalkylene glycol can be maintained in a mixed state without causing separation of the alkanediols having 7 or more carbon atoms in the drying process of the liquid droplets, and is therefore preferred. Further, when the amount of the (poly)oxyalkylene glycol is within the above-described ranges, particularly when it does not exceed the upper limit, the initial viscosity of the coating liquid does not become too high, and separation of the oil layer can be effectively prevented in the usual storage state of the coating liquid, and is therefore preferred from the viewpoint of storability of the coating liquid. Further, such an amount can prevent occurrence of an incompatible state, and is therefore preferred from the viewpoint of gloss.

Furthermore, since the (poly)oxyalkylene glycol hardly dries even if it is left to stand at a high temperature and a low humidity, it advantageously improves the recovery property from clogging of nozzles under an open environment of a relative humidity of 15% RH at 50° C.

1.5.3. Glycol Ethers

The coating liquid according to the present embodiment may contain glycol ethers. The glycol ethers can be preferably used from the viewpoints that separation of the alkanediols having 7 or more carbon atoms in the coating liquid can be inhibited.

Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-n-butyl ether, diethylene glycol mono-tert-butyl ether, triethylene glycol monomethyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol monopropyl ether, dipropylene glycol mono-n-propyl ether, dipropylene glycol iso-propyl ether, dipropylene glycol mono-n-butyl ether, dipropylene glycol mono-tert-butyl ether, 3-methyl-3-methoxy-1-butanol, and 3-methoxy-1-butanol, and these may be used alone or as a mixture of two or more kinds thereof.

Among the glycol ethers, an alkyl ether of a polyol is preferred, and ethylene glycol monoethyl ether, ethylene glycol mono-n-butyl ether, diethylene glycol monomethyl ether, diethylene glycol monoethyl ether, diethylene glycol mono-n-butyl ether, propylene glycol monomethyl ether, propylene glycol monoethyl ether, propylene glycol monobutyl ether, dipropylene glycol monopropyl ether, triethylene glycol monomethyl ether, triethylene glycol monoethyl ether, and triethylene glycol mono-n-butyl ether are particularly preferred.

Triethylene glycol monomethyl ether and 3-methoxy-1-butanol are still more preferred.

The addition amount of the glycol ethers may be appropriately determined, but is preferably from about 0.1 to 12% by mass, and more preferably from about 1 to 6% by mass.

1.5.4. Crystalline Sugar

The coating liquid according to the present embodiment may contain a crystalline sugar which is solid at 20° C. The sugar that can be suitably used in the invention is a low-moisture absorbency sugar which has low-moisture absorbency, and can be stably present in the powder state, specifically in an environment of 20° C. and 60 RH %. Generally, since it is known that the sugar having low-moisture absorbency increases the crystallinity, the crystalline sugar in the invention means a sugar having the above-described physical properties. Accordingly, the sugar may be any sugar having the above-described low-moisture absorbency, but does not mean a sugar always having a crystallinity of 100%.

The crystalline sugar is not particularly limited as long as the effects of the invention can be obtained therefrom, but is preferably one or more selected from the group consisting of maltitol, sorbitol, xylitol, erythritol, trehalose, isotrehalose, neotrehalose, and sucrose. More preferably, the crystalline sugar is one or more selected from the group consisting of trehalose, isotrehalose, neotrehalose, and sucrose. Further, the crystalline sugar may be one or more of monosaccharides and disaccharides selected from the group consisting of maltose, maltitol, sorbitol, xylitol, erythritol, trehalose, isotrehalose, neotrehalose, and sucrose, or a tri- or higher saccharide obtained by combining these sugars or these sugars with other sugars.

Trehalose is a nonreducing disaccharide containing a glucoside bond between the 1-positions of glucose units. Since trehalose is a nonreducing sugar, browning caused by a Maillard reaction does not occur. Accordingly, trehalose is preferred from the viewpoint of ink storage stability. In addition, it has characteristics that solubility in water and water-holding capacity are high and that moisture absorbency is significantly low. Specifically, high-purity anhydrous trehalose has very high solubility in water (69 g/100 g (20° C.)), but does not absorb moisture at 95 RH % or less. Therefore, when trehalose is brought into contact with water, it absorbs the water to become a gel, but under an ordinary environment (about 20° C. and about 45 RH %), trehalose does not exhibit moisture absorbency and can be stably present. In addition, trehalose is preferred from the viewpoint of not reacting with amino group-containing resins.

Furthermore, isotrehalose, neotrehalose, and sucrose are nonreducing disaccharides having glycoside bonds. Since they are nonreducing disaccharides, browning caused by a Maillard reaction does not occur. Accordingly, they are preferred from the viewpoint of ink storage stability of the coating liquid.

According to a preferred embodiment of the invention, the content of the crystalline sugar may be appropriately determined as long as the above-described effects are obtained, but it is preferably from 6.0 to 36.0% by mass, and more preferably from 6.0 to 18.0% by mass, with respect to the total mass of the coating liquid.

1.5.5. Water-Soluble Alkanediol

The coating liquid according to the present embodiment may contain a water-soluble alkanediol. In the present specification, the term "water-soluble" means that the solubility in water (the amount of a solute in 100 g of water) at 20° C. is 10.0 g or more, and the term "poorly water-soluble" means that the solubility in water (the amount of a solute in 100 g of water) is less than 1.0 g.

The water-soluble alkanediol is a both-end-type or one-end-type alkanediol. The water-soluble alkanediol is preferably an alkanediol having 3 to 6 carbon atoms. Preferred examples of the water-soluble alkanediol include water-soluble hexanediols such as 1,2-hexanediol and 1,6-hexanediol, 2-methyl-1,3-propanediol, and 3-methyl-1,5-pentanediol. Among these, 1,2-hexanediol and 3-methyl-1,5-pentanediol are preferred. In addition, 1,6-hexanediol is excellent in discharge stability at high frequencies and, thereby, is also preferred. Herein, the term "both-end-type alkanediol" means an alkanediol having a hydroxyl group on each of both ends of the main chain of an alkyl chain, and the term "one-end-type alkanediol" means an alkanediol having a hydroxyl group on one end of the main chain of an alkyl chain. Therefore, for example, 1,6-hexanediol and 3-methyl-1,5-pentanediol are both-end-type alkanediols, and 1,2-hexanediol is a one-end-type alkanediol.

Furthermore, according to a preferred embodiment of the invention, the content ratio of the alkanediol having 7 or more carbon atoms to the water-soluble alkanediol is preferably from 1:1 to 10:1, and more preferably from 2:1 to 4:1. Within these ranges, aggregation unevenness that occurs when droplet landing time intervals are short may be inhibited in some cases.

Moreover, according to a preferred embodiment of the invention, the addition amount of the water-soluble alkanediol may be appropriately determined as long as aggregation unevenness and streak unevenness can be efficiently inhibited, but is preferably from 0.1 to 4.0% by mass, more preferably from 0.5 to 3.0% by mass, and most preferably from 0.5 to 1.0% by mass, with respect to the total mass of the coating liquid. When the amount of the water-soluble alkanediol is within the above-described ranges, particularly, when it is not less than the lower limit, the occurrence of bleeding can be sufficiently inhibited. Further, when the amount of the water-soluble alkanediol is within the above-described ranges, particularly, when it does not exceed the upper limit, the initial viscosity of the coating liquid does not become too high, and separation of the oil layer can be effectively prevented in the usual storage state of the coating liquid, and is therefore preferred from the viewpoint of storability of the coating liquid. Further, when 1,2-hexanediol that is a preferred embodiment of the water-soluble alkanediol is contained in the amount of 0.1 to 4.0% by mass with respect to the total amount of the composition, a high-quality image with neither streak unevenness nor aggregation unevenness can be obtained, and is therefore effective as an adjuster in the case where the discharge performance varies depending on the type of the pigments or resins.

1.5.6. Other Components

Furthermore, the coating liquid according to the present embodiment may contain a recording medium-solubilizing agent. As the recording medium-solubilizing agent, for example, pyrrolidones such as 2-pyrrolidone, N-methyl-2-pyrrolidone, pyrrolidone carboxylic acids, and alkali metal salts thereof, can be suitably used. In addition, glymes such as diethylene glycol diethylene ether, dipropylene glycol dimethyl ether, and dipropylene glycol diethyl ether, and lactams such as γ-butyrolactone can also be suitably used. The addition amount of the recording medium-solubilizing agent may be appropriately determined, but is preferably from about 0.1 to 30% by mass, and more preferably from about 1 to 20% by mass.

Furthermore, the coating liquid according to the present embodiment may contain a solubilizing aid for the above-described components (particularly oxazoline group-containing resins, carboxyl group-containing resins, alkanediols having 7 or more carbon atoms, and the like), and a hydroxycarboxylic acid ester may be contained as the recording medium-solubilizing agent. The hydroxycarboxylic acid ester preferably has 6 or less carbon atoms, and specific examples thereof include hydroxypropionate esters such as methyl 2-hydroxypropionate, ethyl 2-hydroxypropionate, propyl 2-hydroxypropionate, methyl 3-hydroxypropionate, ethyl 3-hydroxypropionate, and propyl 3-hydroxypropionate, and hydroxybutyrate esters such as methyl 2-hydroxyisobutyrate, methyl 2-hydroxybutyrate, ethyl 2-hydroxyisobutyrate, ethyl 2-hydroxybutyrate, methyl 3-hydroxyisobutyrate, methyl 3-hydroxybutyrate, ethyl 3-hydroxyisobutyrate, and ethyl 3-hydroxybutyrate, and among these, methyl 2-hydroxyisobutyrate or methyl 2-hydroxybutyrate is preferred. The addition amount of the hydroxycarboxylic acid ester may be appropriately determined, but is preferably from 3.0 to 24.0% by mass, and more preferably from 6.0 to 16.0% by mass.

Moreover, the coating liquid according to the present embodiment may contain a wetting agent, for example, glycerin or a derivative thereof, such as 3-(2-hydroxyethoxy)-1,2-propanediol (CAS No. 14641-24-8) and 3-(2-hydroxypropoxy)-1,2-propanediol. Glycerin and a derivative thereof have functions of preventing the coating liquid from drying and solidifying, for example, in nozzle holes, and are therefore preferred from the viewpoint of improving the recovery property from clogging. In the present embodiment, the coating liquid may contain the wetting agent in an amount of 0.1 to 8% by mass.

The coating liquid according to the present embodiment can further contain a nozzle clogging-preventing agent, an antiseptic/anti-fungal agent, an antioxidant, an electroconductivity adjuster, a pH adjuster, a viscosity modifier, a surface tension adjuster, an oxygen absorber, or the like.

Examples of the antiseptic/anti-fungal agents include sodium benzoate, sodium pentachlorophenol, sodium 2-pyridinethiol-1-oxide, sodium sorbate, sodium dehydroacetate, and 1,2-dibenzinethiazolin-3-one (Proxel CRL, Proxel BND, Proxel GXL, Proxel XL-2, and Proxel TN, available from ICI Co., Ltd.).

Furthermore, examples of the pH adjuster, the solubilizing aid, and the antioxidant include amines such as diethanolamine, triethanolamine, propanolamine, and morpholine and modified products thereof; inorganic salts such as potassium hydroxide, sodium hydroxide, and lithium hydroxide; ammonium hydroxide; quaternary ammonium hydroxide (for example, tetramethyl ammonium); carbonates such as potassium carbonate, sodium carbonate, and lithium carbonate; phosphates; ureas such as N-methyl-2-pyrrolidone, urea, thiourea, and tetramethylurea; allophanates such as allophanate and methyl allophanate; biurets such as biuret, dimethyl biuret, and tetramethyl biuret; and L-ascorbic acid and salts thereof.

In addition, the coating liquid according to the present embodiment may contain an antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD 1024 (products of Chiba Specialty Chemicals Inc.), and oxides of lanthanide.

Furthermore, the coating liquid according to the present embodiment may contain a crosslinking catalyst such as organic titanium and organic zirconium.

1.6. Physical Properties of Coating Liquid

The viscosity of the coating liquid according to the present embodiment at 20° C. is preferably from 3 mPa·s to 10 mPa·s, and preferably from 3 mPa·s to 6 mPa·s. When the coating liquid has a viscosity at 20° C. in the above-described ranges, nozzles can discharge an appropriate amount of the coating liquid, and the flight diffraction or scattering of droplets can be further reduced. Thus, such a coating liquid can be suitably used in an ink jet recording apparatus. The viscosity of the coating liquid can be measured with a vibration type viscometer VM-100AL (manufactured by Yamaichi Electronics Co., Ltd.) while keeping the temperature of the coating liquid at 20° C.

Moreover, the surface tension at 20° C. of the coating liquid according to the present embodiment is preferably 26 mN/m or less, and more preferably from 21 mN/m to 26 mN/m. When the surface tension at 20° C. of the coating liquid is within the above-described ranges, the liquid droplets of the coating liquid attached to the recording medium is excellent, and thus, aggregation unevenness, streak unevenness, and the like can be effectively inhibited.

1.7. Method for Preparing Coating Liquid

The coating liquid according to the present embodiment can be prepared by dispersing and mixing each component described above by a proper method. After sufficiently stirring the respective components above, coarse particles and foreign material, which cause clogging, are removed by filtration to obtain a desired coating liquid. The filtration may be preferably performed using a glass fiber filter as a filtration material. The glass fiber is preferably resin-impregnated glass fiber from the viewpoint of an electrostatic adsorption function. The pore size of the glass fiber filter is preferably from 1 to 40 μm and more preferably from 1 to 10 μm from the viewpoints of productivity and adsorptive removal of, for example, an electric charge-free resin. By sufficiently removing adsorption of an electric charge-free resin, etc., the discharge stability can be improved. An example of the filter is Ultipor GF Plus manufactured by Nihon Pall, Ltd.

2. Ink Set

The ink set according to one embodiment of the invention includes the above-described coating liquid for ink jet, and a color ink composition containing at least a colorant and water. Examples of the color ink composition include a yellow ink composition, a magenta ink composition, a cyan ink composition, a black ink composition, and a white ink composition.

2.1. Color Ink Composition

Hereinbelow, the respective components included in the color ink composition according to the present embodiment will be described. Further, the color ink composition may contain the components exemplified as the components included in the coating liquid and description of the components that have been described earlier with the coating liquid are omitted.

2.1.1. Carboxyl Group-Containing Components

In the invention, the color ink composition may contain carboxyl group-containing components. When the color ink composition includes the carboxyl group-containing components, the oxazoline groups contained in the coating layer are reacted with the carboxyl groups contained in the ink, and accordingly, a crosslinking structure (amide ester bond) is easily formed. By this, the water resistance of the color image formed on the coating layer is improved.

The carboxyl group-containing components are not particularly limited, but are preferably included as a colorant or resin dispersant as described later, and the water resistance of the color image formed on the coating layer is further improved.

2.1.2. Colorant

For the color ink composition that is used together with the above-described coating liquid, any colorant of a dye and a pigment can be used, but the pigment can be preferably used from the viewpoints of light resistance and water resistance. Further, the colorant preferably contains a pigment and a dispersant that can disperse the pigment in ink and is preferably included in an anionic dispersion.

As the pigment, inorganic pigments and organic pigments can be used, and these may be used alone or as a mixture of plural kind thereof. As the organic pigments, azo pigments (including, for example, azo lakes, insoluble azo pigments, condensed azo pigments, and chelate azo pigments), polycyclic pigments (for example, phthalocyanine pigments, perylene pigments, perynone pigments, anthraquinone pigments, quinacridone pigments, dioxazine pigments, thioindigo pigments, isoindolinone pigments, and quinophthalone pigments), dye chelates (for example, basic dye-type chelates and acid dye-type chelates), nitro pigments, nitroso pigments, aniline black, or carbon black prepared according to a known method such as a contact method, a furnace method, and a thermal method can be used.

Specific examples of the pigment can be suitably exemplified according to the type (color) of a color ink composition to be obtained. Examples of the pigment for a yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185, and one or more thereof are used. In particular, one or more selected from the group consisting of C.I. Pigment Yellow 74, 110, 128, 129, and 180 are preferably used. Examples of the pigment for a magenta ink composition include C.I. Pigment Red 5, 7, 12, 48 (Ca), 48 (Mn), 57 (Ca), 57:1, 112, 122, 123, 168, 184, 202, and 209 and C.I. Pigment Violet 19, and one or more thereof are used. In particular, one or more selected from the group consisting of C.I. Pigment Red 122, 202, and 209 and C.I. Pigment Violet 19 are preferably used, and also a solid solution thereof may be used. Examples of the pigment for a cyan ink composition include C.I. Pigment Blue 1, 2, 3, 15:2, 15:3, 15:4, 15:34, 16, 22, and 60 and C.I. Vat Blue 4 and 60, and one or more thereof are used. In particular, C.I. Pigment Blue 15:3 and/or 15:4 is preferably used. Especially, C.I. Pigment Blue 15:3 is preferably used.

Examples of the pigment for a black ink composition include inorganic pigments, for example, carbons such as lamp black (C.I. Pigment Black 6), acetylene black, furnace black (C.I. Pigment Black 7), channel black (C.I. Pigment Black 7), and carbon black (C.I. Pigment Black 7), and iron oxide pigments; and organic pigments such as aniline black (C.I. Pigment Black 1). In an aspect of the invention, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (all manufactured by Mitsubishi Chemical Corp.), Special Black 4A and 550 and Printex 95, 90, 85, 80, 75, 45, and 40 (all manufactured by Degussa AG), Regal 660, Rmogul L, and Monarch 1400, 1300, 1100, 800, and 900 (all manufactured by Cabot Corp.), and Raven 7000, 5750, 5250, 3500, 2500 ULTRA, 2000, 1500, 1255, 1200, 1190 ULTRA, 1170, 1100 ULTRA, and Raven 5000 UIII (all manufactured by Columbian Chemicals Co.).

Furthermore, examples of the white pigment for a white ink composition include metal oxides, barium sulfate, and calcium carbonate. Examples of the metal oxides include titanium dioxide, zinc oxide, silica, alumina, and magnesium oxide. Further, the white pigment includes particles having hollow structures, and the particles having hollow structures are not particularly limited, but known ones may be used. As the particles having hollow structures, for example, particles described in U.S. Pat. No. 4,880,465 or the like can be preferably used.

The volume-based 50% cumulative particle diameter of the white pigment (which may be hereinafter referred to an "average particle diameter") is preferably from 30 nm to 600 nm, and more preferably from 200 nm to 400 nm. The average particle diameter of the white pigment can be measured by a particle size distribution measurement device using a laser diffraction scattering method as a measurement theory. Examples of the particle size distribution measurement device include a particle size distribution meter using a dynamic scattering method as a measurement theory (for example, "Microtrac UPA", manufactured by Nikkiso Co., Ltd.).

The concentration of the pigment included in the color ink composition may be adjusted to an appropriate pigment concentration (content) when the ink composition is prepared and, therefore, is not particularly limited. However, the solid content concentration of the pigment can be set preferably to 1.0 to 30.0% by mass.

2.1.3. Resin Dispersant

The color ink composition preferably includes, as its constituent monomers, at least one resin selected from the group consisting of copolymer resins such as hydrophobic monomers and hydrophilic monomers, oxyethyl acrylate-based resins, urethane-based resins, and fluorene skeleton-containing resins, and more preferably at least one resin selected from the group consisting of oxyethyl acrylate-based resins and fluorene skeleton-containing resins. These resin dispersants are adsorbed on the pigment to improve the dispersibility of the pigments.

Furthermore, in the case where the resin dispersant has carboxyl groups, the carboxyl groups easily undergo a crosslinking reaction (formation of amide ester bonds) with oxazoline groups present in the above-described coating layer. Therefore, if the resin dispersant has carboxyl groups, the water resistance of the image formed by the color ink composition may be remarkably improved in some cases.

Specific examples of the hydrophobic monomer in the copolymer resin include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyl toluene, and hydroxyethylated orthophenylphenol acrylate. These may be used alone or as a mixture of two or more kinds thereof.

Specific examples of the hydrophilic monomer include acrylic acid, methacrylic acid, maleic acid, and itaconic acid.

From the viewpoints of achieving good balance among glossiness of a color image, prevention of bronzing, and storage stability of the ink composition and of forming a color image with superior glossiness, the copolymer resin of the hydrophobic monomers and hydrophilic monomers is preferably at least any of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, a styrene-(meth)acrylic acid-(meth)acrylic acid ester copolymer resin, and a hydroxyethylated orthophenylphenol acrylic acid ester-(meth)acrylic acid copolymer resin.

The copolymer resin may be a resin (styrene-acrylic acid resin) containing a polymer prepared by a reaction of styrene and acrylic acid or acrylic acid ester. Alternatively, the copolymer resin may be an acrylic acid-based water-soluble resin or a salt thereof, such as a sodium, potassium, ammonium, triethanolamine, triisopropanolamine, triethylamine, or diethanolamine salt.

The acid value of the copolymer resin is preferably from 50 to 320 and more preferably from 100 to 250 from the viewpoints of achieving good balance among glossiness of a color image, prevention of bronzing, and storage stability of the ink composition and of forming a color image with superior glossiness.

The weight average molecular weight (Mw) of the copolymer resin is preferably from 2000 to 30000, and more preferably from 2000 to 20000, from the viewpoints of achieving good balance among glossiness of a color image, prevention of bronzing, and storage stability of the ink composition and of forming a color image with superior glossiness.

The glass transition temperature (Tg: measured in accordance with JIS K6900) of the copolymer resin is preferably 30° C. or higher, and more preferably from 50 to 130° C., from the viewpoints of achieving good balance among glossiness of a color image, prevention of bronzing, and storage stability of the ink composition and of forming a color image with superior glossiness.

The copolymer resin may be adsorbed on the pigment or may be free in a pigment dispersion in some cases, and preferably has a maximum particle diameter of 0.3 µm or less, and more preferably has an average particle diameter of 0.2 µm or less (more preferably 0.1 µm or less), from the viewpoints of achieving good balance among glossiness of a color image, prevention of bronzing, and storage stability of the ink composition and of forming a color image with superior glossiness. Further, the average particle diameter is an average value of dispersion diameters (50% cumulative diameter) of particles actually formed by the pigment in the dispersion, and can be measured with, for example, Microtrac UPA (Microtrac Inc.).

The content of the copolymer resin is preferably from 20 to 50 parts by mass, and more preferably from 20 to 40 parts by mass, with respect to 100 parts by mass of the pigment, from the viewpoints of achieving good balance among glossiness of a color image, prevention of bronzing, and storage stability of the ink composition and of forming a color image with superior glossiness.

In the invention, an oxyethyl acrylate-based resin also can be used as the resin dispersant. The use of such a resin provides a reduction in the initial viscosity of the ink, excellent storage stability at a high temperature, and an excellent recovery property from clogging, and is therefore more preferred.

The oxyethyl acrylate-based resin is not particularly limited as long as it is a resin having an oxyethyl acrylate skeleton, but is preferably a compound represented by the following general formula (5). Examples of the compound represented by the general formula (5) include resins containing, in molar ratios of monomers, 45 to 55% of ortho-hydroxyethylated phenylphenol acrylate having CAS No. 72009-86-0, 20 to 30% of acrylic acid having CAS No. 79-10-7, and 20 to 30% of methacrylic acid having CAS No. 79-41-4. These may be used alone or as a mixture of two or more kinds thereof. Furthermore, the component proportions of the monomers are not particularly limited, but are preferably 70 to 85% by mass of the ortho-hydroxyethylated phenylphenol acrylate having CAS No. 72009-86-0, 5 to 15% by mass of acrylic acid having CAS No. 79-10-7, and 10 to 20% by mass of methacrylic acid having CAS No. 79-41-4.

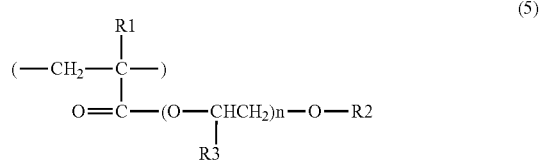

(in formula (5), $R^1$ and/or $R^3$ is/are a hydrogen atom or a methyl group; $R^2$ is an alkyl group or an aryl group; and n is an integer of 1 or more).

Preferred examples of the compound represented by formula (5) include nonylphenoxypolyethylene glycol acrylate and polypropylene glycol #700 acrylate.

The content of the oxyethyl acrylate-based resin is preferably from 10 to 40 parts by mass, and more preferably from 15 to 25 parts by mass, with respect to 100 parts by mass of the pigment, from the viewpoints of achieving good balance between the initial viscosity of the ink composition and the storage stability of the ink composition and of inhibiting aggregation unevenness and forming a color image having superior embedding.

The total of the component proportions of resins derived from monomers having hydroxyl groups selected from the group consisting of acrylic acids and methacrylic acids in the oxyethyl acrylate-based resin is preferably from 30 to 70%, and more preferably from 40 to 60%, from the viewpoints of achieving good balance between the initial viscosity of the ink composition and the storage stability of the ink composition and of the recovery property from clogging.

The number average molecular weight (Mn) of the oxyethyl acrylate-based resin before crosslinking is preferably from 4000 to 9000, and more preferably from 5000 to 8000, from the viewpoints of achieving good balance between the initial viscosity of the ink composition and the storage stability of the ink composition. Mn is measured by, for example, gel permeation chromatography (GPC).

For the oxyethyl acrylate-based resin, the copolymer resin preferably has a maximum particle diameter of 0.3 µm or less, and more preferably has an average particle diameter of 0.2 µm or less (more preferably 0.1 µm or less), from the viewpoints of achieving good balance among glossiness of a color image, prevention of bronzing, and storage stability of the ink composition and of forming a color image with superior glossiness. Further, the average particle diameter is an average value of dispersion diameters (50% cumulative diameter) of particles actually formed by the pigment in the dispersion and can be measured with, for example, Microtrac UPA (Microtrac Inc.).

The content of the oxyethyl acrylate-based resin is preferably from 20 to 50 parts by mass, and more preferably from 20 to 40 parts by mass, with respect to 100 parts by mass of the pigment, from the viewpoints of achieving good balance among glossiness of a color image, prevention of bronzing, and storage stability of the ink composition and of forming a color image with superior glossiness.

Moreover, good balance among glossiness of a color image, prevention of bronzing, and storage stability of the ink composition can be achieved and a color image having superior glossiness can be formed by using a urethane-based resin as a resin dispersant in the color ink composition. The urethane-based resin is a resin containing a polymer obtained by a reaction of a diisocyanate compound and a diol compound, and is preferably a resin having an acid group that is a carboxyl group.

Examples of the diisocyanate compound include araliphatic diisocyanate compounds such as hexamethylene diisocyanate and 2,2,4-trimethyl hexamethylene diisocyanate; aromatic diisocyanate compounds such as touoylene diisocyanate and phenylmethane diisocyanate; and modified compounds thereof.

Examples of the diol compound include polyethers such as polyethylene glycol and polypropylene glycol; polyesters such as polyethylene adipate and polybutylene adipate; and polycarbonates.

The acid value of the urethane-based resin is preferably from 10 to 300 and more preferably from 20 to 100 from the viewpoints of achieving good balance among glossiness of a color image, prevention of bronzing, and storage stability of the ink composition and of forming a color image with superior glossiness. Further, the acid value is the number of mg of KOH required to neutralize 1 g of the resin.

The weight average molecular weight (Mw) of the urethane resin before crosslinking is preferably from 100 to 200000 and more preferably from 1000 to 50000, from the viewpoints of achieving good balance among glossiness of a color image, prevention of bronzing, and storage stability of the ink composition and of forming a color image with superior glossiness. Mw is measured by, for example, gel permeation chromatography (GPC).

The glass transition temperature (Tg: measured in accordance with JIS K6900) of the urethane resin is preferably from −50 to 200° C., and more preferably from −50 to 100° C., from the viewpoints of achieving good balance among glossiness of a color image, prevention of bronzing, and storage stability of the ink composition and of forming a color image with superior glossiness.

The urethane-based resin preferably has a carboxyl group. The carboxyl group easily undergoes a crosslinking reaction (formation of amide ester bonds) with an oxazoline group present in the above-described coating layer. Therefore, if the urethane-based resin has a carboxyl group, the water resistance of the image formed by the color ink composition may be improved remarkably in some cases.

The content of the urethane-based resin is preferably from 20 to 50 parts by mass, and more preferably from 20 to 40 parts by mass, with respect to 100 parts by mass of the pigment, from the viewpoints of achieving good balance among glossiness of a color image, prevention of bronzing, and storage stability of the ink composition and of forming a color image with superior glossiness.

Furthermore, in the invention, the fluorene skeleton-containing resin also can be used as a resin dispersant. The use of such a resin provides a reduction in the initial viscosity of the ink, excellent storage stability at a high temperature, and an excellent fixing property to print paper, and is therefore more preferred.

In addition, the fluorene skeleton-containing resin can be obtained by a reaction of a polyol component containing a first diol containing a fluorene skeleton and a second diol containing a hydrophilic group, and a polyisocyanate component containing a polyisocyanate compound.

The fluorene skeleton-containing resin preferably has a carboxyl group for the same reason with the urethane resin.

Specific examples of the first diol containing a fluorene skeleton include 9,9-bis(4-(hydroxymethoxy)phenyl)fluorene, 9,9-bis(4-(2-hydroxyethoxy)phenyl)fluorene, 9,9-bis(4-(3-hydroxypropoxy)phenyl)fluorene, 9,9-bis(4-(4-hydroxybutoxy)phenyl)fluorene, 9,9-bis(4-hydroxyphenyl)fluorene, 9,9-bis(4-hydroxytoluoyl)fluorene, and 9,9-bis(hydroxyalkyl)fluorene. Further, as the first diol, commercially available products may be used, and examples thereof include bisphenoxyethanolfluorene, bisphenolfluorene, biscresolfluorene (trade names, all manufactured by Osaka Gas Chemicals Co., Ltd.).

The first diol containing a fluorene skeleton may be used alone or in combination of two or more kinds thereof, and preferably includes 9,9-bis(4-(2-hydroxyethoxy)phenyl)fluorene.

Furthermore, the first diol containing a fluorene skeleton may be blended at a proportion of, for example, 40 to 60% by mass, with respect to the fluorene skeleton-containing resin. When the content of the first diol containing a fluorene skeleton is within the above-described ranges, fixability and transparency are excellent.

In the invention, the second diol may have a hydrophilic group. Examples of the hydrophilic group include nonionic groups such as a polyoxyethylene group, and ionic groups such as a carboxyl group, a sulfonyl group, a phosphoric acid group, and a sulfobetaine group.

More specific examples of the second diol having a carboxyl group include dihydroxylcarboxylic acids such as 2,2-dimethylolacetic acid, 2,2-dimethylollactic acid, 2,2-dimethylolpropionic acid (2,2-bis(hydroxymethyl)propionic acid), 2,2-dimethylolbutanoic acid, 2,2-dimethylolbutyric acid, and 2,2-dimethylolvaleric acid, for example, and diaminocarboxylic acids such as lysine and arginine.

Furthermore, examples of the second diol having a sulfonyl group include N,N-bis(2-hydroxyethyl)-2-aminoethane sulfonic acid, 1,3-phenylenediamine-4,6-disulfonic acid, diaminobutanesulfonic acid, 3,6-diamino-2-toluene sulfonic acid, and 2,4-diamino-5-toluene sulfonic acid.

Moreover, examples of the second diol having a phosphoric acid group include 2,3-dihydroxypropylphenylphosphate.

Furthermore, examples of the second diol having a betaine structure-containing group include sufobetaine group-containing compounds obtained by a reaction of a tertiary amine such as N-methyldiethanolamine with 1,3-propanesultone.

Other examples of the second diol include alkylene oxide modified products formed by the addition of alkylene oxides such as ethylene oxide and propylene oxide added to the second diol.

Furthermore, these second diols may be used alone or in combination of two or more kinds thereof, and preferred examples thereof include the second diols having carboxyl groups, for example, 2,2-dimethylolpropionic acid.

Furthermore, the first diol containing a hydrophilic group may be blended at a proportion of, for example, 5 to 15% by mass, with respect to the fluorene skeleton-containing resin. When the content of the first diol containing a fluorene skeleton is within the above-described ranges, fixability and transparency are excellent.

Furthermore, the second diol may be blended such that the acid value of the fluorene skeleton-containing resin is from 10 to 130 KOH mg/g, and preferably from 20 to 60 KOH mg/g.

When the acid value of the fluorene skeleton-containing resin is within the above-described ranges, the dispersion stability of the pigment is excellent.

Moreover, the fluorene skeleton-containing resin may contain, if necessary, a polyol compound. The polyol compound is a compound having two or more hydroxyl groups, and examples thereof include low-molecular-weight polyols and high-molecular-weight polyols.

The polyisocyanate compound is a compound having two or more isocyanate groups, and preferably a compound having two isocyanate groups, and examples thereof include an aliphatic polyisocyanate, an alicyclic polyisocyanate, an aromatic aliphatic polyisocyanate, and an aromatic polyisocyanate.

Examples of the aliphatic polyisocyanate include hexamethylene diisocyanate and tetramethylene diisocyanate.

Examples of the alicyclic polyisocyanate include isophorone diisocyanate(3-isocyanatomethyl-3,5,5-trimethylcyclohexylisocyanate), 4,4'-, 2,4'-, or 2,2'-dicyclohexylmethane diisocyanate, or a mixture thereof.

Examples of the aromatic aliphatic polyisocyanate include 1,3- or 1,4-xylene diisocyanate or a mixture thereof, and 1,3- or 1,4-bis(1-isocyanato-1-methylethyl)benzene or a mixture thereof.

Examples of the aromatic polyisocyanate include 4,4'-, 2,4'-, or 2,2'-diphenylmethane diisocyanate or a mixture thereof, 2,4- or 2,6-triene diisocyanate or a mixture thereof, 4,4'-toluidine diisocyanate, and 1,5-naphthalene diisocyanate.

Furthermore, examples of the polyisocyanate compound include multimers (for examples, dimers and trimers) of various polyisocyanate compounds as described above, such as buriet modified products produced by a reaction of various polyisocyanate compounds as described above or a multimer thereof with water, allophanate modified products produced by a reaction of an alcohol or the low-molecular-weight polyol as described above, oxadiazine trione modified products produced by a reaction with carbonate gas, and polyol modified products produced by a reaction with the low-molecular-weight polyol as described above.

These polyisocyanate compounds may be used alone or in combination of two or more kinds thereof, and preferred examples thereof include alicyclic polyisocyanates, for example, isophorone diisocyanate.

Furthermore, when it is intended to react a polyol component (that is, a first diol containing a fluorene skeleton, a second diol having a hydrophilic group, and if desired, a polyol compound) with a polyisocyanate component (that is, a polyisocyanate compound), a known method may be used, and they may be blended at a proportion, for example, a proportion giving an equivalent ratio (NCO/hydroxyl groups) of isocyanate groups of the polyisocyanate component to the hydroxyl groups of the polyol component of, for example, 0.4 to 1.0, and preferably 0.8 to 0.95. Accordingly, to the fluorene skeleton-containing resin, for example, they may be blended at a proportion of 30 to 45% by mass. When the content of the first diol containing a fluorene skeleton is within the above-described ranges, fixability and transparency are excellent.

For this reaction, at a normal pressure, if desired, under a nitrogen atmosphere, the reaction temperature is set to, for example, 40 to 100° C., and the reaction time is set to, for example, 5 to 24 hours. Further, in this reaction, if desired, a reaction solvent or a reaction catalyst may be used.

The reaction solvent is a low-boiling point solvent that is inert to an isocyanate group, and examples thereof include alcohols such as ethanol and isopropanol, ketones such as acetone and methyl ethyl ketone, ethers such as tetrahydrofuran, cellosolves such as methyl cellosolve and ethyl cellosolve, carbitols such as methyl carbitol and ethyl carbitol, and nitriles such as acetonitrile. The amount of the reaction solvent to be used is appropriately determined.

Examples of the reaction catalyst include amine-based, tin-based, or lead-based known urethanated catalysts. The addition amount of the reaction solvent is appropriately determined.

By this reaction, the polyol component and the polyisocyanate component can undergo a urethanation reaction, thereby obtaining the fluorene skeleton-containing resin of the invention.

The fluorene skeleton-containing resin thus obtained has a weight average molecular weight, in terms of a value calculated with polystyrene as a standard by GPC measurement, for example, a number average molecular weight of 2000 to 40000 (a weight average molecular weight of 3000 to 50000), and more preferably a number average molecular weight of 2000 to 10000.

In addition, the fluorene skeleton-containing resin of the invention is preferably prepared as an aqueous dispersion, and, for example, in the case where the hydrophilic group of the second diol is an anionic group, the obtained fluorene skeleton-containing resin is subjected to neutralization of the anionic groups, and then dispersed in water.

For the neutralization of an anionic group, a neutralizing agent selected from organic amines such as trimethylamine, triethylamine, tri-n-propylamine, tributylamine, triethanolamine, aminomethylpropanol, aminomethylpropanediol, aminoethylpropanediol, trihydroxymethylaminomethane, monoethanolamine, and triisopropanolamine, inorganic alkali salts such as potassium hydroxide and sodium hydroxide, and ammonia is added to a fluorene skeleton-containing resin to form a salt of the anionic group.

The addition amount of the neutralizing agent can be, for example, from 0.3 to 1.0 equivalent per equivalent of the anionic group.

Subsequently, in order to disperse the fluorene skeleton-containing resin in water, for example, water is slowly added to the fluorene skeleton-containing resin while stirring the fluorene skeleton-containing resin, or the fluorene skeleton-containing resin is slowly added to water while stirring the water. As a result, an aqueous dispersion of the fluorene skeleton-containing resin is prepared. Further, for stirring, they are preferably mixed using a homomixer or the like to provide a high shear therewith.

The addition amount of water is appropriately determined depending on the solid content mass of the aqueous dispersion of the fluorene skeleton-containing resin, but it is preferably, for example, in the range of 100 to 900 parts by mass, and more preferably 200 to 400 parts by mass, with respect to 100 parts by mass of the fluorene skeleton-containing resin.

Thus, an aqueous dispersion of the fluorene skeleton-containing resin, in which the fluorene skeleton-containing resin of the invention is dispersed in water, is prepared. Further, the pH of the aqueous dispersion of the fluorene skeleton-containing resin is usually from about 7 to 9.

The aqueous dispersion of the fluorene skeleton-containing resin thus obtained is prepared, which has a solid content of, for example, 10 to 50% by mass, and preferably 25 to 35% by mass.

Furthermore, in the case where the reaction solvent is used in the urethanation reaction, the urethanation reaction solvent is evaporated by, for example, heating at a suitable temperature under reduced pressure, after completion of the urethanation reaction or after dispersal in water.

The content of the fluorene skeleton-containing resin is preferably from 20 to 50 parts by mass, and more preferably from 20 to 40 parts by mass, with respect to 100 parts by mass of the pigment, from viewpoints of achieving good balance among fixability of a color image, prevention of bronzing, and storage stability of the ink composition, and of forming a color image having excellent glossiness.

The mass ratio (copolymer resin/fixative pigment dispersant) of the copolymer resin to the fixative pigment dispersant is preferably from 1/2 to 2/1, and but it is more preferably from 1/1.5 to 1.5/1, from viewpoints of achieving good balance among fixability of a color image, prevention of bronzing, and storage stability of the ink composition, and of forming a color image having excellent glossiness.

The mass ratio (pigment/copolymer resin and fixative pigment dispersant) of the solid content of the pigment to the solid content of the copolymer resin and the fixative pigment dispersant is preferably from 100/40 to 100/100 from viewpoints of achieving good balance of glossiness of a color image, prevention of bronzing, and storage stability of the ink composition and of forming a color image having excellent glossiness.

A surfactant may be used as a dispersant. Examples of the surfactant include anionic surfactants such as fatty acid salts, higher alkyl dicarboxylic acid salts, higher alcohol sulfuric acid ester salts, higher alkyl sulfonic acid salts, condensates of higher fatty acids and amino acids, sulfosuccinic acid ester salts, naphthenic acid salts, liquid fatty oil sulfuric acid ester salts, and alkyl allyl sulfonic acid salts; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. When the surfactant is added to the ink composition, it naturally serves as a surfactant.

3. Ink Jet Recording Method

The ink jet recording method according to one embodiment of the invention is an ink jet recording method using ink jet recording apparatus having a head, which includes discharging liquid droplets of a coating liquid; attaching the liquid droplets onto a recording medium to form dots including the liquid droplets; and repeating the discharging and the attaching to form a coating layer on the recording medium.

First, the ink jet recording apparatus used in the ink jet recording method according to the present embodiment will be described.

3.1. Ink Jet Recording Apparatus

An ink jet recording apparatus according to an embodiment of the invention has a head equipped with nozzle rows formed of a plurality of nozzle holes. The ink jet recording apparatus according to the embodiment will be described with reference to FIG. 1 to FIG. 3. In the drawings used in the following description, scales of members are appropriately modified so as to recognize the members.

FIG. 1 is a block diagram showing a recording system in which the ink jet recording apparatus 1 is connected to a computer 90.

Figure 2:
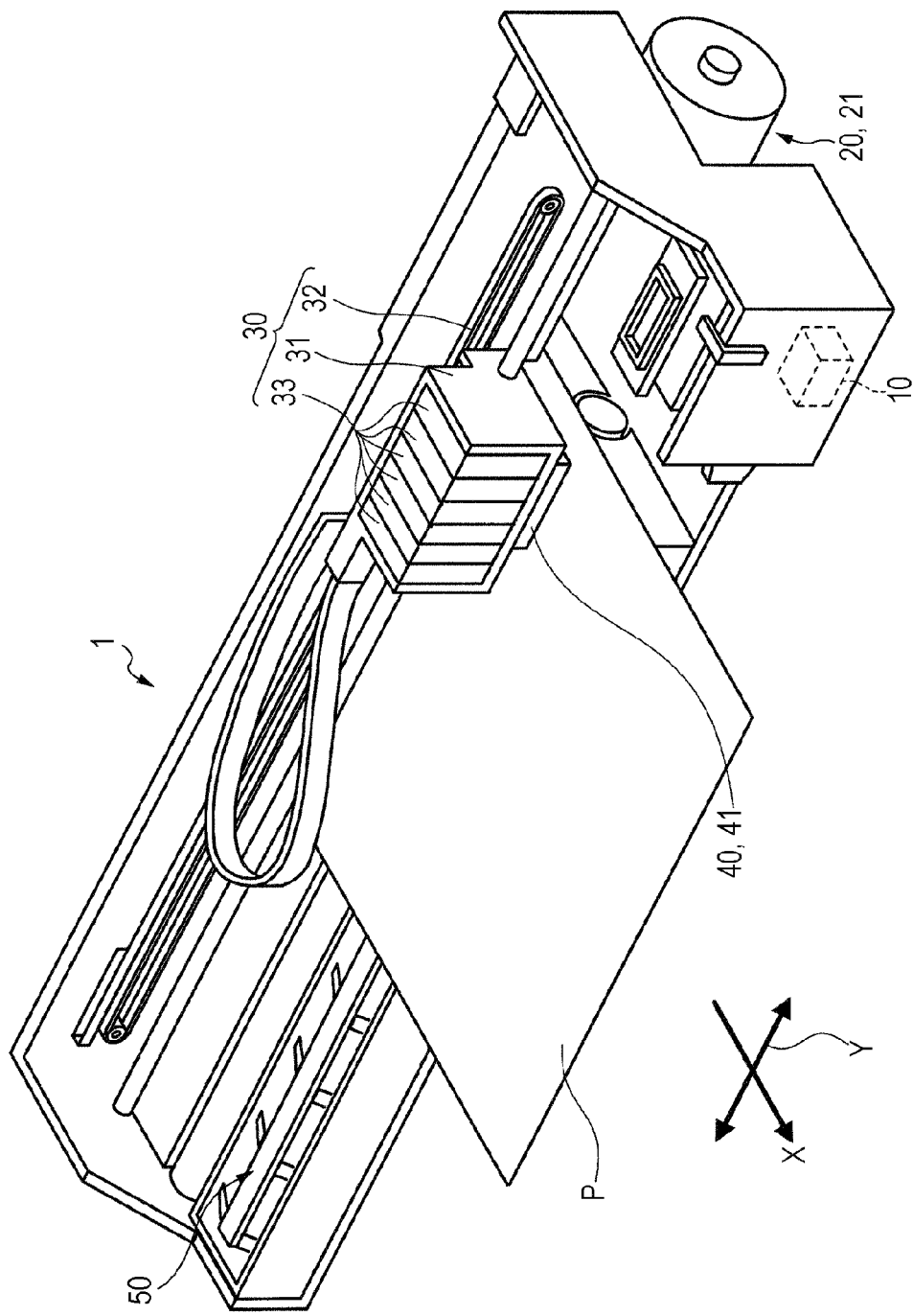
FIG. 2 is a perspective view schematically showing a configuration of the recording apparatus according to an embodiment of the invention.

FIG. 2 is a perspective view schematically showing a configuration of the ink jet recording apparatus 1.

The ink jet recording apparatus 1 is an apparatus that records (forms) a recording material on a recording medium P by an ink jet system. A controller 10 is a control unit that controls the ink jet recording apparatus 1. An interface unit 11 (I/F) is provided to perform transmission and reception of data between the computer 90 and the ink jet recording apparatus 1. The CPU 12 is an operation processing device that performs the whole control of the ink jet recording apparatus 1. A memory 13 is provided to secure an area for storing programs of the CPU 12 or a work area. The CPU 12 controls units by a unit control circuit 14. A detector group 60 monitors a situation in the ink jet recording apparatus, and the controller 10 controls the units on the basis of the detection result.

A transport unit 20 transports the recording medium from the upstream side to the downstream side in a direction in which the recording medium P is continuous (a transport direction, an X direction in the drawing). A transport roller 21 is rotated by a motor to supply the recording medium before recording to a coating liquid applying area for the ink jet.

A carriage unit 30 reciprocates the head in a movement direction (a width direction of the recording medium, a Y direction in the drawing). The carriage unit 30 includes a carriage 31 on which the head 41 is mounted, a carriage moving mechanism 32 that reciprocates the carriage, and an ink cartridge 33.

The ink cartridge 33 is filled with the coating liquid described above or a color ink composition. The ink cartridge 33 is not limited to being mounted on the carriage 4 as described in the embodiment. For example, the ink cartridge 33 may be a type of ink cartridge that is mounted in a case of the printer 1 to supply ink to the head 41 through a liquid supply tube.

The head unit 40 has the head 41 provided in the carriage 31. Nozzle holes for discharging the coating liquid or the color ink composition are provided on the bottom face of the head 41. A configuration of the head 41 (arrangement of nozzle rows) will be described later.

A drying unit 50 dries the coating liquid or color ink composition applied onto the recording medium. The drying unit may be, for example, a platen heater, a warm air heater, an IR heater, which have a heating function. An air blower without the heating function may be used.

Figure 3:
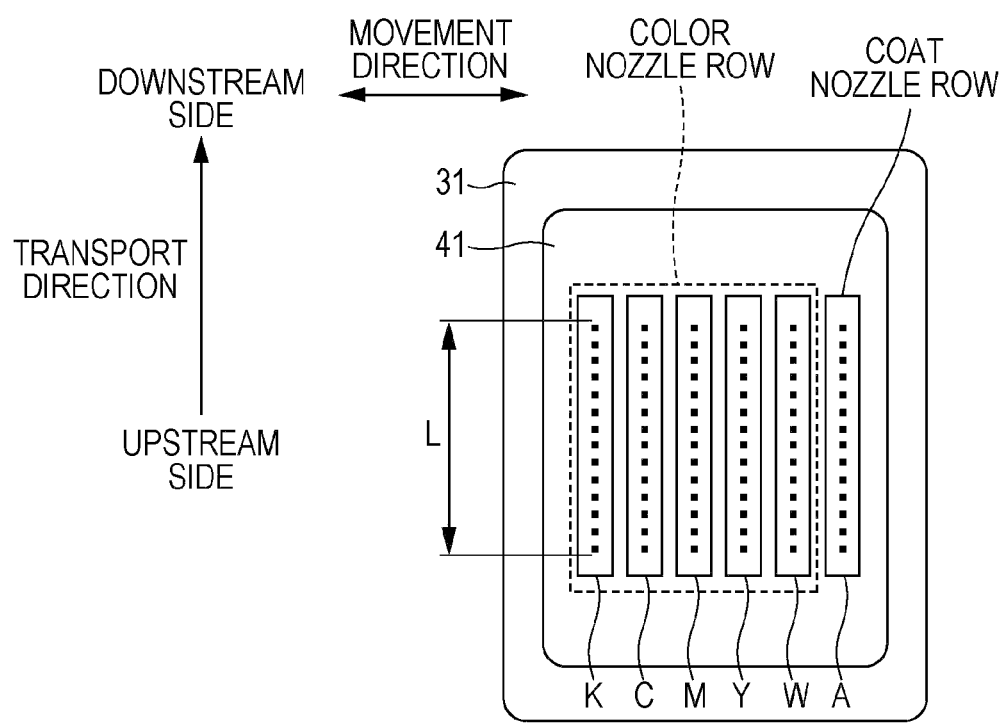
FIG. 3 is a schematic diagram showing the lower surface of a head according to an embodiment of the invention.

FIG. 3 is a schematic diagram illustrating the bottom face of the head 41. The shown configuration is an example for reference of description, and the head 41 may have the configuration different from the shown configuration.

The head 41 is equipped with a plurality of nozzle rows. In the example shown in FIG. 3, six nozzle rows are arranged along the transport direction of the recording medium P. The six nozzle rows are a black nozzle row (K), a cyan nozzle row (C), a magenta nozzle row (M), a yellow nozzle row (Y), a coating nozzle row (A), and a white nozzle row (W). The black nozzle row, the cyan nozzle row, the magenta nozzle row, the yellow nozzle row, and the white nozzle row are nozzle rows (color nozzle rows) which discharge color ink compositions for recording a color image (a coloring layer). The coating nozzle row is a nozzle row which discharges the coating liquid for recording a coating image (a coating layer).

A plurality of nozzle holes are arranged in each nozzle row. In the example shown in FIG. 3, each nozzle row is formed of a plurality of nozzle holes arranged along the transport direction of the recording medium P. Each nozzle row is formed of 180 nozzle holes, respectively. 180 nozzle holes of each nozzle row are arranged along the transport direction at a nozzle pitch N of a distance of $1/180$ inch (that is, L in the drawing is 1 inch). By discontinuously discharging the coating liquid (or the ink) from any nozzle row, a plurality of dot rows are recorded at the distance of $1/180$ inch whenever the carriage 31 is moved once in the movement direction. The distance D of dots recorded on the recording medium P may be represented by "N/k" using the nozzle pitch N and an integer k representing the number of passing times. For example, when an image is recorded by resolution of 720 dpi, the distance D is 1/720 inch, and it is k=4 (four passes).

The ink jet recording apparatus 1 is a so-called serial type ink jet recording apparatus. The serial type ink jet recording apparatus is equipped with a head mounted on a carriage moving in a predetermined direction, and the head is moved according to movement of the carriage to discharge liquid droplets onto the recording medium.

As the serial type ink jet recording apparatus is exemplified as the ink jet recording apparatus according to the embodiment, but the invention is not limited thereto, and may be, for example, a line type ink jet recording apparatus. In the line type ink jet recording apparatus, a head is provided broader than a width of a recording medium, and the head does not move and discharges liquid droplets onto the recording medium.

In the line type ink jet recording apparatus, nozzle rows are arranged along the width direction of the recording medium, the plurality of nozzle holes constituting the nozzle row are arranged along the width direction of the recording medium. In this case, when each nozzle row is formed of 180 nozzle holes, the nozzle holes are arranged along the width direction of the recording medium at a nozzle pitch of a distance of 1/180 inch. The coating liquid (or the ink) is discharged once from any nozzle row to arrange dots at the distance of 1/180 inch and to record an image by resolution of 180 dpi. That is, when the line type ink jet recording apparatus is used, image resolution in the width direction of the recording medium is the same as the number of nozzle holes arranged along the width direction of the recording medium. In the line type ink jet recording apparatus, when an image is recorded by resolution equal to or higher than 180 dpi, for example, when the image is recorded by resolution of 720 dpi, four nozzle rows, each of which is formed of 180 nozzle holes are used to record an image of 720 dpi. Accordingly, the dot distance D may be represented by "N/l" using the nozzle pitch N and the number of nozzle rows l. In the example described above, the dot distance D is 1/720 since N is 1/180 and l is 4.

3.2 Recording Method

An ink jet recording method according to the embodiment is performed using the ink jet recording apparatus, and includes discharging liquid droplets of the coating liquid from nozzle holes, attaching the liquid droplets of the coating liquid onto a recording medium to form dots formed of the liquid droplets, and repeating the discharging and the dot forming process plural times, to form a coating layer on the recording medium. Hereinafter, the ink jet recording method using the ink jet recording apparatus 1 will be described in detail.

The ink jet recording apparatus 1 alternately repeats an operation (a pass) of moving the carriage 31 in the movement direction and a transport operation. In this case, when each pass is performed, the controller 10 controls the carriage unit 30 to move the carriage 31 in the movement direction, and controls the head unit 40 to discharge the liquid droplets of the coating liquid from predetermined nozzle holes of the head 41 to attach the liquid droplets onto the recording medium P. The controller 10 controls the transport unit 20 to transport the recording medium P with a predetermined amount of transport at the transport operation time in the transport direction of the recording medium P.

The pass and the transport operation are repeated such that the area in which a plurality of liquid droplets (dots) are attached is gradually transported toward the drying unit 50. At a position opposed to the drying unit 50, the liquid droplets attached onto the recording medium are dried to form the coating layer. Thereafter, the formed recording material may be wound in a roll shape by a winding mechanism (not shown), or may be transported by a flatbed mechanism (not shown).

The drying process of the coating layer performed by the drying unit is not an essential process, but is effective from the viewpoint of further improving water resistance of the coating layer. The drying process may be a drying process of a color image (to be described layer) as well as the drying process of the coating layer. The timing of performing the drying process is not particularly limited. For example, the drying process may be performed at the same time of the coating layer forming process, before or after the coating layer forming process, or before and after the coating layer forming process, and may be performed after the color image forming process. A plurality of drying processes (for example, any combination of the examples) may be performed. When the drying process is performed after the color image forming process, the winding mechanism or the flatbed mechanism described above may be the drying process.

unit of the drying process is not particularly limited, but preferably the liquid droplets are dried by heating. The heating in the drying process includes, for example, an aspect of indirectly heating the liquid droplets through the recording medium in the same manner as the drying unit 50 as well as an aspect of directly heating the liquid droplets by the warm air, the IR heater, or the like are included.

When the coating layer having the dot distance in which the image resolution is equal to or more than 300 dpi in the arrangement direction (in the example shown in FIG. 1, the width direction of the recording medium P) of the nozzle rows is formed using the serial type ink jet recording apparatus, a diameter of dots attached onto the recording medium is preferably larger than the dot distance. When the coating layer having the dot distance in which the image resolution is equal to or more than 300 dpi in the arrangement direction of the nozzle holes is formed using the line type ink jet recording apparatus, a diameter of dots attached onto the recording medium is preferably larger than the dot distance.

With such a configuration, it is possible to obtain a sufficiently coated recording medium by a smaller number of passes or a smaller number of nozzle rows.

Even when a high quality coating layer (image resolution equal to or more than 300 dpi) is formed by a larger number of passes or a larger number of nozzle rows, it is possible to obtain a recording medium which is sufficiently coated by the coating layer with a uniform thickness.

As described in the test result of examples to be described later, in the coating liquid for ink jet according to the embodiment, when the mass of the liquid droplets of the coating liquid discharged by the discharging is from 1 ng to 15 ng per droplet, the recording medium is sufficiently coated by a smaller number of passes or a smaller number of nozzle rows. Meanwhile, when the number of passes is increased or the number of nozzle rows is increased, it is possible to obtain a multilayer state of a sufficiently coated uniform film, and thus it is preferable from the viewpoint that it is possible to adjust accommodation capacity of ink with a uniform film thickness.

The ink jet recording method according to the embodiment may include a color image forming process of attaching the liquid droplets with the color ink composition described above onto the coating layer to form a color image. Since the coating layer according to the embodiment is formed of the coating liquid described above, acceptability of the color ink composition is excellent, and it is possible to improve water resistance of the recorded color image.

It is preferable to form the coating layer in the area where at least the color image is formed, but the coating layer may be formed on the whole face of the recording medium. For example, when an image is recorded on a packaging material (a shrink film) using a heat-shrinkable material as the recording medium, and when the coating layer is formed on the whole face of the recording medium, contraction of the recording medium is uniform, and it is possible to reduce distortion or curling of the recording medium even when there is a difference in linear expansion coefficient between the heat-shrinkable material and the coating layer. In a case of a recording material which can be obtained using the coating liquid according to the invention and the color ink composition including a component having a carboxyl group, water resistance is excellent by heating in a heat shrinking process (an aspect of performing the drying process after the color image forming process). The heat-shrinkable material is not particularly limited, but may be preferably polyvinyl chloride-based resin, polystyrene-based resin, polypropylene-based resin, polyethylene-based resin, or the like.

When a color image formed of a low duty area and a high duty area is formed on the coating layer and when the coating layer is formed on the whole face, there is a case where it is possible to reduce a difference in glossiness between the low duty area and the high duty area.

Examples of the recording medium used in the ink jet recording method according to the present embodiment include non-ink-absorbing or low-ink-absorbing recording media.

Examples of the non-ink-absorbing recording media include plastic films having no ink absorption layers, and materials obtained by coating base materials such as paper with plastics or by attaching plastic films to base materials. Examples of the plastics include polyvinyl chloride, polyethylene terephthalate, polycarbonate, polystyrene, polyurethane, polyethylene, and polypropylene.

Examples of the low-ink-absorbing recording media include coated paper provided with a coating layer for receiving oil-based ink on the surface, for example, print paper such as art paper, coated paper, and matt paper.

In addition to the recording media, non-ink-absorbing or low-ink-absorbing recording media such as metal and glass may be used.

In the ink jet recording method according to the present embodiment, the above-described coating liquid is used to form a coating layer (ink receiving layer), and therefore, with the non-ink-absorbing or low-ink-absorbing recording media, a water-based ink composition for ink jet in the related art can be used to form an image.

4. Examples

Hereinbelow, the invention will be described in detail with reference to Examples and Comparative Examples, but is not limited thereto.

4.1. Preparation of Coating Liquid

The respective components were mixed and stirred according to the compositions in Tables 1 to 7, and then filtered through a 10-µm membrane filter, thereby obtaining a coating liquid. Further, the respective components in Tables 1 to 7 are as follows.

WS-700 (trade name "Epocros WS-700", main chain: acryl-based, weight average molecular weight: 40000, amount of oxazoline groups: 4.5 mmol/g (in terms of solid content), solid content 25%)

WS-500 (trade name "Epocros WS-500", main chain: acryl-based, weight average molecular weight: 70000, amount of oxazoline groups: 4.5 mmol/g (in terms of solid content), solid content 39%)

1,2-OCD (1,2-octanediol)

1,2-HED (1,2-hexanediol)

Silicone-based surf./hydrogen (polyorganosiloxane-based surfactant. Compound of formula (2), in which R is a hydrogen atom, a is an integer of 7 to 11, m is an integer of 30 to 50, and n is an integer of 3 to 5)

Silicone-based surf./methyl 1 (polyorganosiloxane-based surfactant. Compound of formula (2), in which R is a methyl group, a is an integer of 9 to 13, m is an integer of 2 to 4, and n is an integer of 1 to 2)

Silicone-based surf./methyl 2 (polyorganosiloxane-based surfactant. Compound of formula (2), in which R is a methyl group, a is an integer of 6 to 18, m is an integer of 0, and n is an integer of 1)

Fluorine-based surf. (fluorine-based surfactant, trade name "FTERGENT 251", manufactured by Neos Co., Ltd.)

TPG (tripropylene glycol)

TEGmME (triethylene glycol monomethyl ether)

3-M-1-B (3-methoxy-1-butanol)

2-H-IBM (methyl 2-hydroxyisobutanoate)

TEA (triethanolamine)

ff Resin (carboxyl group-containing fluorene skeleton-containing resin, acid value of 40, solid content of 30%, CAS NO. 9111-03-27-0)

Deionized water

TABLE 1

|  |  |  | Examples |  |  |  |  |  |
|---|---|---|---|---|---|---|---|---|
|  |  |  | 1 | 2 | 3 | 4 | 5 | 6 |
| Composition of coating liquid | Oxazoline group-containing resin | WS700 | 45.0 | 45.0 | 45.0 | 45.0 | 36.0 | 36.0 |
|  | Alkanediol having 7 or more carbon atoms | 1,2-OCD | 1.5 | 1.5 | 1.5 | 1.5 | 1.5 | 1.5 |
|  | Alkanediol having less than 7 carbon atoms | 1,2-HED |  |  |  |  |  |  |
|  | Surfactant | Silicone-based Surf./hydrogen | 0.2 |  | 0.1 |  | 0.2 |  |
|  |  | Silicone-based Surf./methyl 1 |  | 0.2 | 0.1 |  |  | 0.2 |
|  |  | Fluorine-based Surf. |  |  |  | 0.2 |  |  |

TABLE 1-continued

| | | | | | | | | |
|---|---|---|---|---|---|---|---|---|
| | Other components | TPG | | | | | 6.0 | 6.0 |
| | | TEGmME | | | | | | |
| | | 3-M-1-B | | | | | | |
| | Resin | ff Resin | 12.5 | 12.5 | 12.5 | 12.5 | 10.0 | 10.0 |
| | Deionized water | | Balance | Balance | Balance | Balance | Balance | Balance |
| | Total | | 100.0 | 100.0 | 100.0 | 100.0 | 100.0 | 100.0 |
| Evaluation test | Evaluation 1 (aggregation) | Condition 1A | B | B | A | A | B | B |
| | | Condition 1B | A | A | A | A | A | A |
| | Evaluation 2 (edge) | Condition 2A | A | A | A | B | A | A |
| | | Condition 2B | A | A | A | B | A | A |
| | Evaluation 3 (water resistance of coating layer) | Condition 3 | A | A | A | A | A | A |
| | Evaluation 5 (receivability) | Condition 5A | Color ink set 1 | A | A | A | A | A | A |
| | | | Color ink set 2 | B | B | B | B | B | B |
| | | | Color ink set 3 | A | A | A | A | A | A |
| | | Condition 5B | Color ink set 1 | A | A | A | A | A | A |
| | | | Color ink set 2 | A | A | A | A | A | A |
| | | | Color ink set 3 | A | A | A | A | A | A |
| | | Condition 5C | Color ink set 1 | A | A | A | A | C | C |
| | | | Color ink set 2 | B | B | B | B | C | C |
| | | | Color ink set 3 | A | A | A | A | C | C |
| | Evaluation 6 (water resistance of color image) | Condition 6 | Color ink set 1 | A | A | A | A | A | A |
| | | | Color ink set 2 | A | A | A | A | A | A |
| | | | Color ink set 3 | A | A | A | A | A | A |
| | Evaluation 7 (storage stability) | Condition 7 | B | B | B | B | B | B |

| | | | Examples | | | | | |
|---|---|---|---|---|---|---|---|---|
| | | | 7 | 8 | 9 | 10 | 11 | 12 |
| Composition of coating liquid | Oxazoline group-containing resin | WS700 | 36.0 | 36.0 | 36.0 | 36.0 | 36.0 | 36.0 |
| | Alkanediol having 7 or more carbon atoms | 1,2-OCD | 1.5 | 1.5 | 1.5 | 1.5 | 1.5 | 1.5 |
| | Alkanediol having less than 7 carbon atoms | 1,2-HED | | | | | | |
| | Surfactant | Silicone-based Surf./hydrogen | 0.1 | | 0.2 | | 0.1 | |
| | | Silicone-based Surf./methyl 1 | 0.1 | | | 0.2 | 0.1 | |
| | | Fluorine-based Surf. | | 0.2 | | | | 0.2 |
| | Other components | TPG | 6.0 | 6.0 | 6.0 | 6.0 | 6.0 | 6.0 |
| | | TEGmME | | | | | | |
| | | 3-M-1-B | | | | | | |
| | Resin | ff Resin | 10.0 | 10.0 | | | | |
| | Deionized water | | Balance | Balance | Balance | Balance | Balance | Balance |
| | Total | | 100.0 | 100.0 | 100.0 | 100.0 | 100.0 | 100.0 |
| Evaluation test | Evaluation 1 (aggregation) | Condition 1A | A | A | B | B | A | A |
| | | Condition 1B | A | A | A | A | A | A |
| | Evaluation 2 (edge) | Condition 2A | A | B | A | A | A | B |
| | | Condition 2B | A | B | A | A | A | B |
| | Evaluation 3 (water resistance of coating layer) | Condition 3 | A | A | C | C | C | C |
| | Evaluation 5 (receivability) | Condition 5A | Color ink set 1 | A | A | A | A | A | A |
| | | | Color ink set 2 | B | B | B | B | B | B |
| | | | Color ink set 3 | A | A | A | A | A | A |
| | | Condition 5B | Color ink set 1 | A | A | A | A | A | A |
| | | | Color ink set 2 | A | A | A | A | A | A |
| | | | Color ink set 3 | A | A | A | A | A | A |
| | | Condition 5C | Color ink set 1 | C | C | C | C | C | C |
| | | | Color ink set 2 | C | C | C | C | C | C |
| | | | Color ink set 3 | C | C | C | C | C | C |
| | Evaluation 6 (water resistance of color image) | Condition 6 | Color ink set 1 | A | A | A | A | A | A |
| | | | Color ink set 2 | A | A | A | A | A | A |
| | | | Color ink set 3 | A | A | A | A | A | A |
| | Evaluation 7 (storage stability) | Condition 7 | B | B | A | A | A | A |

TABLE 2

|  |  |  | Examples | | | | | | | |
| --- | --- | --- | --- | --- | --- | --- | --- | --- | --- | --- |
|  |  |  | 13 | 14 | 15 | 16 | 17 | 18 | 19 | 20 |
| Composition of coating liquid | Oxazoline group-containing resin | WS700 | 36.0 | 36.0 | 36.0 | 36.0 | 36.0 | 36.0 | 36.0 | 36.0 |
|  | Alkanediol having 7 or more carbon atoms | 1,2-OCD | 1.5 | 1.5 | 1.5 | 1.5 | 1.5 | 1.5 | 1.5 | 1.5 |
|  | Alkanediol having less than 7 carbon atoms | 1,2-HED |  |  |  |  |  |  |  |  |
|  | Surfactant | Silicone-based Surf./hydrogen | 0.2 |  | 0.1 |  | 0.2 |  | 0.1 |  |
|  |  | Silicone-based Surf./methyl 1 |  | 0.2 | 0.1 |  |  | 0.2 | 0.1 |  |
|  |  | Fluorine-based Surf. |  |  |  | 0.2 |  |  |  | 0.2 |
|  | Other components | TPG |  |  |  |  |  |  |  |  |
|  |  | TEGmME | 6.0 | 6.0 | 6.0 | 6.0 | 6.0 | 6.0 | 6.0 | 6.0 |
|  |  | 3-M-1-B |  |  |  |  |  |  |  |  |
|  | Resin | ff Resin |  |  |  |  |  |  |  |  |
|  | Deionized water |  | Balance | Balance | Balance | Balance | Balance | Balance | Balance | Balance |
|  | Total |  | 100.0 | 100.0 | 100.0 | 100.0 | 100.0 | 100.0 | 100.0 | 100.0 |
| Evaluation test | Evaluation 1 (aggregation) | Condition 1A | B | B | A | A | B | B | A | A |
|  |  | Condition 1B | A | A | A | A | A | A | A | A |
|  | Evaluation 2 (edge) | Condition 2A | A | A | A | B | A | A | A | B |
|  |  | Condition 2B | A | A | A | B | A | A | A | B |
|  | Evaluation 3 (water resistance of coating layer) | Condition 3 | A | A | A | A | C | C | C | C |
|  | Evaluation 5 (receivability) | Condition 5A | Color ink set 1 | A | A | A | A | A | A | A | A |
|  |  |  | Color ink set 2 | B | B | B | B | B | B | B | B |
|  |  |  | Color ink set 3 | A | A | A | A | A | A | A | A |
|  |  | Condition 5B | Color ink set 1 | A | A | A | A | A | A | A | A |
|  |  |  | Color ink set 2 | A | A | A | A | A | A | A | A |
|  |  |  | Color ink set 3 | A | A | A | A | A | A | A | A |
|  |  | Condition 5C | Color ink set 1 | C | C | C | C | C | C | C | C |
|  |  |  | Color ink set 2 | C | C | C | C | C | C | C | C |
|  |  |  | Color ink set 3 | C | C | C | C | C | C | C | C |
|  | Evaluation 6 (water resistance of color image) | Condition 6 | Color ink set 1 | A | A | A | A | A | A | A | A |
|  |  |  | Color ink set 2 | A | A | A | A | A | A | A | A |
|  |  |  | Color ink set 3 | A | A | A | A | A | A | A | A |
|  | Evaluation 7 (storage stability) | Condition 7 | B | B | B | B | A | A | A | A |

|  |  |  | Examples | | | | | | | |
| --- | --- | --- | --- | --- | --- | --- | --- | --- | --- | --- |
|  |  |  | 21 | 22 | 23 | 24 | 25 | 26 | 27 | 28 |
| Composition of coating liquid | Oxazoline group-containing resin | WS700 | 36.0 | 36.0 | 36.0 | 36.0 | 36.0 | 36.0 | 36.0 | 36.0 |
|  | Alkanediol having 7 or more carbon atoms | 1,2-OCD | 1.5 | 1.5 | 1.5 | 1.5 | 1.5 | 1.5 | 1.5 | 1.5 |
|  | Alkanediol having less than 7 carbon atoms | 1,2-HED |  |  |  |  |  |  |  |  |
|  | Surfactant | Silicone-based Surf./hydrogen | 0.2 |  | 0.1 |  | 0.2 |  | 0.1 |  |
|  |  | Silicone-based Surf./methyl 1 |  | 0.2 | 0.1 |  |  | 0.2 | 0.1 |  |
|  |  | Fluorine-based Surf. |  |  |  | 0.2 |  |  |  | 0.2 |
|  | Other components | TPG |  |  |  |  |  |  |  |  |
|  |  | TEGmME |  |  |  |  |  |  |  |  |
|  |  | 3-M-1-B | 6.0 | 6.0 | 6.0 | 6.0 | 6.0 | 6.0 | 6.0 | 6.0 |
|  | Resin | ff Resin | 10.0 | 10.0 | 10.0 | 10.0 |  |  |  |  |
|  | Deionized water |  | Balance | Balance | Balance | Balance | Balance | Balance | Balance | Balance |
|  | Total |  | 100.0 | 100.0 | 100.0 | 100.0 | 100.0 | 100.0 | 100.0 | 100.0 |
| Evaluation test | Evaluation 1 (aggregation) | Condition 1A | B | B | A | A | B | B | A | A |
|  |  | Condition 1B | A | A | A | A | A | A | A | A |
|  | Evaluation 2 (edge) | Condition 2A | A | A | A | B | A | A | A | B |
|  |  | Condition 2B | A | A | A | B | A | A | A | B |

TABLE 2-continued

| | | | | | | | | | | |
|---|---|---|---|---|---|---|---|---|---|---|
| Evaluation 3 (water resistance of coating layer) | Condition 3 | | A | A | A | A | C | C | C | C |
| Evaluation 5 (receivability) | Condition 5A | Color ink set 1 | A | A | A | A | A | A | A | A |
| | | Color ink set 2 | B | B | B | B | B | B | B | B |
| | | Color ink set 3 | A | A | A | A | A | A | A | A |
| | Condition 5B | Color ink set 1 | A | A | A | A | A | A | A | A |
| | | Color ink set 2 | A | A | A | A | A | A | A | A |
| | | Color ink set 3 | A | A | A | A | A | A | A | A |
| | Condition 5C | Color ink set 1 | A | A | A | A | A | A | A | A |
| | | Color ink set 2 | B | B | B | B | B | B | B | B |
| | | Color ink set 3 | A | A | A | A | A | A | A | A |
| Evaluation 6 (water resistance of color image) | Condition 6 | Color ink set 1 | A | A | A | A | A | A | A | A |
| | | Color ink set 2 | A | A | A | A | A | A | A | A |
| | | Color ink set 3 | A | A | A | A | A | A | A | A |
| Evaluation 7 (storage stability) | Condition 7 | | B | B | B | B | A | A | A | A |

TABLE 3

| | | | Examples | | | | | |
|---|---|---|---|---|---|---|---|---|
| | | | 29 | 30 | 31 | 32 | 33 | 34 |
| Composition of coating liquid | Oxazoline group-containing resin | WS700 | 45.0 | 36.0 | 45.0 | 36.0 | 45.0 | 36.0 |
| | | WS500 | | | | | | |
| | Alkanediol having 7 or more carbon atoms | 1,2-OCD | 1.5 | 1.5 | 1.5 | 1.5 | 1.5 | 1.5 |
| | Alkanediol having less than 7 carbon atoms | 1,2-HED | | | | | | |
| | Surfactant | Silicone-based Surf./hydrogen | 0.1 | 0.1 | 0.1 | 0.1 | | |
| | | Silicone-based Surf./methyl 1 | 0.1 | 0.1 | 0.1 | 0.1 | | |
| | | Silicone-based Surf./methyl 2 | | | | | 0.2 | 0.2 |
| | | Fluorine-based Surf. | | | | | | |
| | Other components | TPG | | | | | | |
| | | TEGmME | | | | | | |
| | | 3-M-1-B | | | | 6.0 | 6.0 | 6.0 |
| | Resin | ff Resin | 10.0 | 12.5 | 10.0 | 12.5 | 12.5 | 10.0 |
| | Deionized water | | Balance | Balance | Balance | Balance | Balance | Balance |
| | Total | | 100.0 | 100.0 | 100.0 | 100.0 | 100.0 | 100.0 |
| Evaluation test | Evaluation 1 (aggregation) | Condition 1A | A | A | A | A | B | B |
| | | Condition 1B | A | A | A | A | A | A |
| | Evaluation 2 (edge) | Condition 2A | A | A | A | A | A | A |
| | | Condition 2B | A | A | A | A | A | A |
| | Evaluation 3 (water resistance of coating layer) | Condition 3 | A | A | A | A | A | A |
| | Evaluation 5 (receivability) | Condition 5A | Color ink set 1 | A | A | A | A | A | A |
| | | | Color ink set 2 | B | B | B | B | B | B |
| | | | Color ink set 3 | A | A | A | A | A | A |
| | | Condition 5B | Color ink set 1 | A | A | A | A | A | A |
| | | | Color ink set 2 | A | A | A | A | A | A |
| | | | Color ink set 3 | A | A | A | A | A | A |
| | | Condition 5C | Color ink set 1 | A | A | A | A | A | A |
| | | | Color ink set 2 | B | B | B | B | B | B |
| | | | Color ink set 3 | A | A | A | A | A | A |
| | Evaluation 6 (water resistance of color image) | Condition 6 | Color ink set 1 | A | A | A | A | A | A |
| | | | Color ink set 2 | A | A | A | A | A | A |
| | | | Color ink set 3 | A | A | A | A | A | A |
| | Evaluation 7 (storage stability) | Condition 7 | B | B | B | B | B | B |

TABLE 3-continued

|  |  |  | Examples | | | | | |
|---|---|---|---|---|---|---|---|---|
|  |  |  | 35 | 36 | 37 | 38 | 39 | 40 |
| Composition of coating liquid | Oxazoline group-containing resin | WS700 |  |  |  |  |  |  |
|  |  | WS500 | 45.0 | 36.0 | 45.0 | 36.0 | 45.0 | 36.0 |
|  | Alkanediol having 7 or more carbon atoms | 1,2-OCD | 1.5 | 1.5 | 1.5 | 1.5 | 1.5 | 1.5 |
|  | Alkanediol having less than 7 carbon atoms | 1,2-HED |  |  |  |  |  |  |
|  | Surfactant | Silicone-based Surf./hydrogen | 0.1 | 0.1 | 0.1 | 0.1 | 0.1 | 0.1 |
|  |  | Silicone-based Surf./methyl 1 | 0.1 | 0.1 | 0.1 | 0.1 | 0.1 | 0.1 |
|  |  | Silicone-based Surf./methyl 2 |  |  |  |  |  |  |
|  |  | Fluorine-based Surf. |  |  |  |  |  |  |
|  | Other components | TPG |  |  |  |  |  |  |
|  |  | TEGmME |  |  |  |  |  |  |
|  |  | 3-M-1-B |  | 6.0 |  |  | 6.0 | 6.0 |
|  | Resin | ff Resin | 12.5 | 10.0 | 10.0 | 12.5 | 10.0 | 12.5 |
|  | Deionized water |  | Balance | Balance | Balance | Balance | Balance | Balance |
|  |  | Total | 100.0 | 100.0 | 100.0 | 100.0 | 100.0 | 100.0 |
| Evaluation test | Evaluation 1 (aggregation) | Condition 1A | A | A | A | A | A | A |
|  |  | Condition 1B | A | A | A | A | A | A |
|  | Evaluation 2 (edge) | Condition 2A | A | A | A | A | A | A |
|  |  | Condition 2B | A | A | A | A | A | A |
|  | Evaluation 3 (water resistance of coating layer) | Condition 3 | A | A | B | A | B | A |
|  | Evaluation 5 (receivability) | Condition 5A | Color ink set 1 | A | A | A | A | A | A |
|  |  |  | Color ink set 2 | B | B | B | B | B | B |
|  |  |  | Color ink set 3 | A | A | A | A | A | A |
|  |  | Condition 5B | Color ink set 1 | A | A | A | A | A | A |
|  |  |  | Color ink set 2 | A | A | A | A | A | A |
|  |  |  | Color ink set 3 | A | A | A | A | A | A |
|  |  | Condition 5C | Color ink set 1 | A | A | A | A | A | A |
|  |  |  | Color ink set 2 | B | B | B | B | B | B |
|  |  |  | Color ink set 3 | A | A | A | A | A | A |
|  | Evaluation 6 (water resistance of color image) | Condition 6 | Color ink set 1 | A | A | A | A | A | A |
|  |  |  | Color ink set 2 | A | A | A | A | A | A |
|  |  |  | Color ink set 3 | A | A | A | A | A | A |
|  | Evaluation 7 (storage stability) | Condition 7 | B | B | B | B | B | B |

TABLE 4

|  |  |  | Examples | | | | | |
|---|---|---|---|---|---|---|---|---|
|  |  |  | 69 | 70 | 71 | 72 | 73 | 74 |
| Composition of coating liquid | Oxazoline group-containing resin | WS700 | 45.0 | 36.0 | 45.0 | 36.0 | 45.0 | 36.0 |
|  |  | WS500 |  |  |  |  |  |  |
|  | Alkanediol having 7 or more carbon atoms | 1,2-OCD | 1.5 | 1.5 | 1.5 | 1.5 | 1.5 | 1.5 |
|  | Alkanediol having less than 7 carbon atoms | 1,2-HED |  |  |  |  |  |  |
|  | Surfactant | Silicone-based Surf./hydrogen | 0.1 | 0.1 | 0.1 | 0.1 |  |  |
|  |  | Silicone-based Surf./methyl 1 | 0.1 | 0.1 | 0.1 | 0.1 |  |  |
|  |  | Silicone-based Surf./methyl 2 |  |  |  |  | 0.2 | 0.2 |
|  |  | Fluorine-based Surf. |  |  |  |  |  |  |
|  | Other components | TPG |  |  |  |  |  |  |
|  |  | TEGmME |  |  |  |  |  |  |
|  |  | 3-M-1-B |  | 6.0 |  | 6.0 |  | 6.0 |
|  |  | 2-H-IBM |  |  |  |  |  |  |

TABLE 4-continued

|  |  |  |  |  |  |  |  |  |  |
|---|---|---|---|---|---|---|---|---|---|
|  |  | Neutralizing agents | TEA | 0.9 | 0.9 | 0.9 | 0.9 | 0.9 | 0.9 |
|  |  | Resin | ff Resin | 10.0 | 12.5 | 10.0 | 12.5 | 12.5 | 10.0 |
|  |  | Deionized water |  | Balance | Balance | Balance | Balance | Balance | Balance |
|  |  | Total |  | 100.0 | 100.0 | 100.0 | 100.0 | 100.0 | 100.0 |
| Evaluation test | Evaluation 1 (aggregation) | Condition 1A |  | A | A | A | A | B | B |
|  |  | Condition 1B |  | A | A | A | A | A | A |
|  | Evaluation 2 (edge) | Condition 2A |  | A | A | A | A | A | A |
|  |  | Condition 2B |  | A | A | A | A | A | A |
|  | Evaluation 3 (water resistance of coating layer) | Condition 3 |  | A | A | A | A | A | A |
|  | Evaluation 5 (receivability) | Condition 5A | Color ink set 1 | A | A | A | A | A | A |
|  |  |  | Color ink set 2 | B | B | B | B | B | B |
|  |  |  | Color ink set 3 | A | A | A | A | A | A |
|  |  | Condition 5B | Color ink set 1 | A | A | A | A | A | A |
|  |  |  | Color ink set 2 | A | A | A | A | A | A |
|  |  |  | Color ink set 3 | A | A | A | A | A | A |
|  |  | Condition 5C | Color ink set 1 | A | A | A | A | A | A |
|  |  |  | Color ink set 2 | B | B | B | B | B | B |
|  |  |  | Color ink set 3 | A | A | A | A | A | A |
|  | Evaluation 6 (water resistance of color image) | Condition 6 | Color ink set 1 | A | A | A | A | A | A |
|  |  |  | Color ink set 2 | A | A | A | A | A | A |
|  |  |  | Color ink set 3 | A | A | A | A | A | A |
|  | Evaluation 7 (storage stability) | Condition 7 |  | A | A | A | A | A | A |

|  |  |  | Examples |  |  |  |  |  |
|---|---|---|---|---|---|---|---|---|
|  |  |  | 75 | 76 | 77 | 78 | 79 | 80 |
| Composition of coating liquid | Oxazoline group-containing resin | WS700 |  |  |  |  |  |  |
|  |  | WS500 | 45.0 | 36.0 | 45.0 | 36.0 | 45.0 | 36.0 |
|  | Alkanediol having 7 or more carbon atoms | 1,2-OCD | 1.5 | 1.5 | 1.5 | 1.5 | 1.5 | 1.5 |
|  | Alkanediol having less than 7 carbon atoms | 1,2-HED |  |  |  |  |  |  |
|  | Surfactant | Silicone-based Surf./hydrogen | 0.1 | 0.1 | 0.1 | 0.1 | 0.1 | 0.1 |
|  |  | Silicone-based Surf./methyl 1 | 0.1 | 0.1 | 0.1 | 0.1 | 0.1 | 0.1 |
|  |  | Silicone-based Surf./methyl 2 |  |  |  |  |  |  |
|  |  | Fluorine-based Surf. |  |  |  |  |  |  |
|  | Other components | TPG |  |  |  |  |  |  |
|  |  | TEGmME |  |  |  |  |  |  |
|  |  | 3-M-1-B |  | 6.0 |  | 6.0 | 6.0 |  |
|  |  | 2-H-IBM |  |  |  |  |  |  |
|  | Neutralizing agents | TEA | 0.9 | 0.9 | 0.9 | 0.9 | 0.9 | 0.9 |
|  | Resin | ff Resin | 12.5 | 10.0 | 10.0 | 12.5 | 10.0 | 12.5 |
|  | Deionized water |  | Balance | Balance | Balance | Balance | Balance | Balance |
|  | Total |  | 100.0 | 100.0 | 100.0 | 100.0 | 100.0 | 100.0 |
| Evaluation test | Evaluation 1 (aggregation) | Condition 1A |  | A | A | A | A | A | A |
|  |  | Condition 1B |  | A | A | A | A | A | A |
|  | Evaluation 2 (edge) | Condition 2A |  | A | A | A | A | A | A |
|  |  | Condition 2B |  | A | A | A | A | A | A |
|  | Evaluation 3 (water resistance of coating layer) | Condition 3 |  | A | A | B | A | B | A |
|  | Evaluation 5 (receivability) | Condition 5A | Color ink set 1 | A | A | A | A | A | A |
|  |  |  | Color ink set 2 | B | B | B | B | B | B |
|  |  |  | Color ink set 3 | A | A | A | A | A | A |
|  |  | Condition 5B | Color ink set 1 | A | A | A | A | A | A |
|  |  |  | Color ink set 2 | A | A | A | A | A | A |
|  |  |  | Color ink set 3 | A | A | A | A | A | A |
|  |  | Condition 5C | Color ink set 1 | A | A | A | A | A | A |
|  |  |  | Color ink set 2 | B | B | B | B | B | B |
|  |  |  | Color ink set 3 | A | A | A | A | A | A |
|  | Evaluation 6 (water resistance of color image) | Condition 6 | Color ink set 1 | A | A | A | A | A | A |
|  |  |  | Color ink set 2 | A | A | A | A | A | A |
|  |  |  | Color ink set 3 | A | A | A | A | A | A |
|  | Evaluation 7 (storage stability) | Condition 7 |  | A | A | A | A | A | A |

TABLE 5

| | | | \multicolumn{6}{c}{Examples} | | | | | |
|---|---|---|---|---|---|---|---|---|
| | | | 81 | 82 | 83 | 84 | 85 | 86 |
| Composition of coating liquid | Oxazoline group-containing resin | WS700 | 45.0 | 36.0 | 45.0 | 36.0 | 45.0 | 36.0 |
| | | WS500 | | | | | | |
| | Alkanediol having 7 or more carbon atoms | 1,2-OCD | 1.5 | 1.5 | 1.5 | 1.5 | 1.5 | 1.5 |
| | Alkanediol having less than 7 carbon atoms | 1,2-HED | | | | | | |
| | Surfactant | Silicone-based Surf./hydrogen | 0.1 | 0.1 | 0.1 | 0.1 | | |
| | | Silicone-based Surf./methyl 1 | 0.1 | 0.1 | 0.1 | 0.1 | | |
| | | Silicone-based Surf./methyl 2 | | | | | 0.2 | 0.2 |
| | | Fluorine-based Surf. | | | | | | |
| | Other components | TPG | | | | | | |
| | | TEGmME | | | | | | |
| | | 3-M-1-B | | | | | | |
| | | 2-H-IBM | | | 6.0 | 6.0 | | 6.0 |
| | Neutralizing agents | TEA | 0.9 | 0.9 | 0.9 | 0.9 | 0.9 | 0.9 |
| | Resin | ff Resin | 10.0 | 12.5 | 10.0 | 12.5 | 12.5 | 10.0 |
| | Deionized water | | Balance | Balance | Balance | Balance | Balance | Balance |
| | Total | | 100.0 | 100.0 | 100.0 | 100.0 | 100.0 | 100.0 |
| Evaluation test | Evaluation 1 (aggregation) | Condition 1A | A | A | A | A | B | B |
| | | Condition 1B | A | A | A | A | A | A |
| | Evaluation 2 (edge) | Condition 2A | A | A | A | A | A | A |
| | | Condition 2B | A | A | A | A | A | A |
| | Evaluation 3 (water resistance of coating layer) | Condition 3 | A | A | A | A | A | A |
| | Evaluation 5 (receivability) | Condition 5A | Color ink set 1 | A | A | A | A | A | A |
| | | | Color ink set 2 | B | B | B | B | B | B |
| | | | Color ink set 3 | A | A | A | A | A | A |
| | | Condition 5B | Color ink set 1 | A | A | A | A | A | A |
| | | | Color ink set 2 | A | A | A | A | A | A |
| | | | Color ink set 3 | A | A | A | A | A | A |
| | | Condition 5C | Color ink set 1 | A | A | A | A | A | A |
| | | | Color ink set 2 | B | B | B | B | B | B |
| | | | Color ink set 3 | A | A | A | A | A | A |
| | Evaluation 6 (water resistance of color image) | Condition 6 | Color ink set 1 | A | A | A | A | A | A |
| | | | Color ink set 2 | A | A | A | A | A | A |
| | | | Color ink set 3 | A | A | A | A | A | A |
| | Evaluation 7 (storage stability) | Condition 7 | A | A | A | A | A | A |

| | | | \multicolumn{6}{c}{Examples} | | | | | |
|---|---|---|---|---|---|---|---|---|
| | | | 87 | 88 | 89 | 90 | 91 | 92 |
| Composition of coating liquid | Oxazoline group-containing resin | WS700 | | | | | | |
| | | WS500 | 45.0 | 36.0 | 45.0 | 36.0 | 45.0 | 36.0 |
| | Alkanediol having 7 or more carbon atoms | 1,2-OCD | 1.5 | 1.5 | 1.5 | 1.5 | 1.5 | 1.5 |
| | Alkanediol having less than 7 carbon atoms | 1,2-HED | | | | | | |
| | Surfactant | Silicone-based Surf./hydrogen | 0.1 | 0.1 | 0.1 | 0.1 | 0.1 | 0.1 |
| | | Silicone-based Surf./methyl 1 | 0.1 | 0.1 | 0.1 | 0.1 | 0.1 | 0.1 |
| | | Silicone-based Surf./methyl 2 | | | | | | |
| | | Fluorine-based Surf. | | | | | | |
| | Other components | TPG | | | | | | |
| | | TEGmME | | | | | | |
| | | 3-M-1-B | | | | | | |
| | | 2-H-IBM | | 6.0 | | | 6.0 | 6.0 |

TABLE 5-continued

|  |  | Neutralizing agents | TEA | 0.9 | 0.9 | 0.9 | 0.9 | 0.9 | 0.9 |
|---|---|---|---|---|---|---|---|---|---|
|  |  | Resin | ff Resin | 12.5 | 10.0 | 10.0 | 12.5 | 10.0 | 12.5 |
|  |  | Deionized water |  | Balance | Balance | Balance | Balance | Balance | Balance |
|  |  | Total |  | 100.0 | 100.0 | 100.0 | 100.0 | 100.0 | 100.0 |
| Evaluation test | Evaluation 1 (aggregation) | Condition 1A |  | A | A | A | A | A | A |
|  |  | Condition 1B |  | A | A | A | A | A | A |
|  | Evaluation 2 (edge) | Condition 2A |  | A | A | A | A | A | A |
|  |  | Condition 2B |  | A | A | A | A | A | A |
|  | Evaluation 3 (water resistance of coating layer) | Condition 3 |  | A | A | B | A | B | A |
|  | Evaluation 5 (receivability) | Condition 5A | Color ink set 1 | A | A | A | A | A | A |
|  |  |  | Color ink set 2 | B | B | B | B | B | B |
|  |  |  | Color ink set 3 | A | A | A | A | A | A |
|  |  | Condition 5B | Color ink set 1 | A | A | A | A | A | A |
|  |  |  | Color ink set 2 | A | A | A | A | A | A |
|  |  |  | Color ink set 3 | A | A | A | A | A | A |
|  |  | Condition 5C | Color ink set 1 | A | A | A | A | A | A |
|  |  |  | Color ink set 2 | B | B | B | B | B | B |
|  |  |  | Color ink set 3 | A | A | A | A | A | A |
|  | Evaluation 6 (water resistance of color image) | Condition 6 | Color ink set 1 | A | A | A | A | A | A |
|  |  |  | Color ink set 2 | A | A | A | A | A | A |
|  |  |  | Color ink set 3 | A | A | A | A | A | A |
|  | Evaluation 7 (storage stability) | Condition 7 |  | A | A | A | A | A | A |

TABLE 6

|  |  |  |  | Comparative Examples ||||||||||
|---|---|---|---|---|---|---|---|---|---|---|---|---|---|
|  |  |  |  | 1 | 2 | 3 | 4 | 5 | 6 | 7 | 8 | 9 | 10 |
| Composition of coating liquid | Oxazoline group-containing resin | WS700 |  |  |  |  |  | 45.0 | 45.0 | 45.0 | 45.0 | 45.0 | 45.0 |
|  | Alkanediol having 7 or more carbon atoms | 1,2-OCD |  | 1.5 | 1.5 | 1.5 | 1.5 | 1.5 |  |  |  |  |  |
|  | Alkanediol having less than 7 carbon atoms | 1,2-HED |  |  |  |  |  |  |  |  |  |  | 1.5 |
|  | Surfactant | Silicone-based Surf./hydrogen |  | 0.2 |  | 0.1 |  | 0.2 |  | 0.1 |  | 0.1 |  |
|  |  | Silicone-based Surf./methyl 1 |  |  | 0.2 | 0.1 |  |  | 0.2 | 0.1 |  | 0.1 |  |
|  |  | Fluorine-based Surf. |  |  |  |  | 0.2 |  |  |  | 0.2 |  |  |
|  | Other components | TPG |  |  |  |  |  |  |  |  |  |  |  |
|  |  | TEGmME |  |  |  |  |  |  |  |  |  |  |  |
|  |  | 3-M-1-B |  |  |  |  |  |  |  |  |  |  |  |
|  | Resin | ff Resin |  | 12.5 | 12.5 | 12.5 | 12.5 | 12.5 | 12.5 | 12.5 | 12.5 | 12.5 | 12.5 |
|  | Deionized water |  |  | Balance | Balance | Balance | Balance | Balance | Balance | Balance | Balance | Balance | Balance |
|  | Total |  |  | 100.0 | 100.0 | 100.0 | 100.0 | 100.0 | 100.0 | 100.0 | 100.0 | 100.0 | 100.0 |
| Evaluation test | Evaluation 1 (aggregation) | Condition 1A |  | B | B | A | A | C | C | C | B | B | B |
|  |  | Condition 1B |  | A | A | A | A | B | A | A | A | A | A |
|  | Evaluation 2 (edge) | Condition 2A |  | A | A | A | B | C | B | B | B | B | B |
|  |  | Condition 2B |  | A | A | A | B | C | B | B | B | B | B |
|  | Evaluation 3 (water resistance of coating layer) | Condition 3 |  | C | C | C | C | A | A | A | A | A | A |
|  | Evaluation 5 (receivability) | Condition 5A | Color ink set 1 | B | B | B | B | B | B | B | A | A | A |
|  |  |  | Color ink set 2 | B | B | B | B | B | B | B | B | B | B |
|  |  |  | Color ink set 3 | B | B | B | B | B | B | B | A | A | A |
|  |  | Condition 5B | Color ink set 1 | B | B | B | B | B | A | A | A | A | A |
|  |  |  | Color ink set 2 | B | B | B | B | B | A | A | A | A | A |
|  |  |  | Color ink set 3 | B | B | B | B | B | A | A | A | A | A |
|  |  | Condition 5C | Color ink set 1 | B | B | B | B | B | B | B | A | A | A |
|  |  |  | Color ink set 2 | B | B | B | B | B | B | B | B | B | B |
|  |  |  | Color ink set 3 | B | B | B | B | B | A | A | A | A | A |
|  | Evaluation 6 (water resistance of color image) | Condition 6 | Color ink set 1 | C | C | C | C | A | A | A | A | A | A |
|  |  |  | Color ink set 2 | C | C | C | C | A | A | A | A | A | A |
|  |  |  | Color ink set 3 | C | C | C | C | A | A | A | A | A | A |
|  | Evaluation 7 (storage stability) | Condition 7 |  | A | A | A | A | B | B | B | B | B | B |

TABLE 6-continued

|  |  |  | Comparative Examples | | | | | | | | | |
|---|---|---|---|---|---|---|---|---|---|---|---|---|
|  |  |  | 11 | 12 | 13 | 14 | 15 | 16 | 17 | 18 | 19 | 20 |
| Composition of coating liquid | Oxazoline group-containing resin | WS700 |  |  |  |  |  | 36.0 | 36.0 | 36.0 | 36.0 | 45.0 |
|  | Alkanediol having 7 or more carbon atoms | 1,2-OCD | 1.5 | 1.5 | 1.5 | 1.5 | 1.5 |  |  |  |  |  |
|  | Alkanediol having less than 7 carbon atoms | 1,2-HED |  |  |  |  |  |  |  |  |  | 1.5 |
|  | Surfactant | Silicone-based Surf./hydrogen | 0.2 |  | 0.1 |  |  |  | 0.2 |  | 0.1 | 0.1 |
|  |  | Silicone-based Surf./methyl 1 |  | 0.2 | 0.1 |  |  |  |  | 0.2 | 0.1 | 0.1 |
|  |  | Fluorine-based Surf. |  |  |  | 0.2 |  |  |  |  | 0.2 |  |
|  | Other components | TPG | 6.0 | 6.0 | 6.0 | 6.0 | 6.0 | 6.0 | 6.0 | 6.0 | 6.0 |  |
|  |  | TEGmME |  |  |  |  |  |  |  |  |  |  |
|  |  | 3-M-1-B |  |  |  |  |  |  |  |  |  |  |
|  | Resin | ff Resin | 10.0 | 10.0 | 10.0 | 10.0 | 10.0 | 10.0 | 10.0 | 10.0 | 10.0 | 12.5 |
|  | Deionized water |  | Balance | Balance | Balance | Balance | Balance | Balance | Balance | Balance | Balance | Balance |
|  | Total |  | 100.0 | 100.0 | 100.0 | 100.0 | 100.0 | 100.0 | 100.0 | 100.0 | 100.0 | 100.0 |
| Evaluation test | Evaluation 1 (aggregation) | Condition 1A | B | B | A | A | C | C | C | B | B | B |
|  |  | Condition 1B | A | A | A | A | B | A | A | A | A | A |
|  | Evaluation 2 (edge) | Condition 2A | A | A | A | B | C | B | B | B | B | B |
|  |  | Condition 2B | A | A | A | B | C | B | B | B | B | B |
|  | Evaluation 3 (water resistance of coating layer) | Condition 3 | C | C | C | C | A | A | A | A | A | A |
|  | Evaluation 5 (receivability) | Condition 5A | Color ink set 1 | B | B | B | B | B | B | B | A | A | A |
|  |  |  | Color ink set 2 | B | B | B | B | B | B | B | B | B | B |
|  |  |  | Color ink set 3 | B | B | B | B | B | B | B | A | A | A |
|  |  | Condition 5B | Color ink set 1 | B | B | B | B | B | A | A | A | A | A |
|  |  |  | Color ink set 2 | B | B | B | B | B | A | A | A | A | A |
|  |  |  | Color ink set 3 | B | B | B | B | B | A | A | A | A | A |
|  |  | Condition 5C | Color ink set 1 | C | C | C | C | C | C | C | C | C | C |
|  |  |  | Color ink set 2 | C | C | C | C | C | C | C | C | C | C |
|  |  |  | Color ink set 3 | C | C | C | C | C | C | C | C | C | C |
|  | Evaluation 6 (water resistance of color image) | Condition 6 | Color ink set 1 | C | C | C | C | A | A | A | A | A | A |
|  |  |  | Color ink set 2 | C | C | C | C | A | A | A | A | A | A |
|  |  |  | Color ink set 3 | C | C | C | C | A | A | A | A | A | A |
|  | Evaluation 7 (storage stability) | Condition 7 | A | A | A | A | B | B | B | B | B | B |

TABLE 7

|  |  |  | Comparative Examples | | | | | | | | | | |
|---|---|---|---|---|---|---|---|---|---|---|---|---|---|
|  |  |  | 21 | 22 | 23 | 24 | 25 | 26 | 27 | 28 | 29 | 30 | 31 |
| Composition of coating liquid | Oxazoline group-containing resin | WS700 |  |  |  |  | 36.0 | 36.0 | 36.0 | 36.0 | 36.0 | 45.0 |  |
|  | Alkanediol having 7 or more carbon atoms | 1,2-OCD | 1.5 | 1.5 | 1.5 | 1.5 | 1.5 |  |  |  |  |  | 1.5 |
|  | Alkanediol having less than 7 carbon atoms | 1,2-HED |  |  |  |  |  |  |  |  |  | 1.5 |  |
|  | Surfactant | Silicone-based Surf./hydrogen | 0.2 |  | 0.1 |  |  | 0.2 |  | 0.1 |  | 0.1 | 0.2 |
|  |  | Silicone-based Surf./methyl 1 |  | 0.2 | 0.1 |  |  |  | 0.2 | 0.1 |  | 0.1 |  |
|  |  | Fluorine-based Surf. |  |  |  | 0.2 |  |  |  |  | 0.2 |  |  |
|  | Other components | TPG |  |  |  |  |  |  |  |  |  |  |  |
|  |  | TEGmME | 6.0 | 6.0 | 6.0 | 6.0 | 6.0 | 6.0 | 6.0 | 6.0 | 6.0 |  |  |
|  |  | 3-M-1-B |  |  |  |  |  |  |  |  |  |  | 6.0 |
|  | Resin | ff Resin | 10.0 | 10.0 | 10.0 | 10.0 | 10.0 | 10.0 | 10.0 | 10.0 | 10.0 | 12.5 | 10.0 |
|  | Deionized water |  | Balance | Balance | Balance | Balance | Balance | Balance | Balance | Balance | Balance | Balance | Balance |
|  | Total |  | 100.0 | 100.0 | 100.0 | 100.0 | 100.0 | 100.0 | 100.0 | 100.0 | 100.0 | 100.0 | 100.0 |

TABLE 7-continued

| Evaluation test | Evaluation 1 (aggregation) | Condition 1A | | B | B | A | A | C | C | C | B | B | B | B |
|---|---|---|---|---|---|---|---|---|---|---|---|---|---|---|
| | | Condition 1B | | A | A | A | A | B | A | A | A | A | A | A |
| | Evaluation 2 (edge) | Condition 2A | | A | A | A | B | C | B | B | B | B | B | A |
| | | Condition 2B | | A | A | A | B | C | B | B | B | B | B | A |
| | Evaluation 3 (water resistance of coating layer) | Condition 3 | | C | C | C | C | A | A | A | A | A | A | C |
| | Evaluation 5 (receivability) | Condition 5A | Color ink set 1 | B | B | B | B | B | B | B | A | A | A | B |
| | | | Color ink set 2 | B | B | B | B | B | B | B | B | B | B | B |
| | | | Color ink set 3 | B | B | B | B | B | B | B | A | A | A | B |
| | | Condition 5B | Color ink set 1 | B | B | B | B | B | A | A | A | A | A | B |
| | | | Color ink set 2 | B | B | B | B | B | A | A | A | A | A | B |
| | | | Color ink set 3 | B | B | B | B | B | A | A | A | A | A | B |
| | | Condition 5C | Color ink set 1 | C | C | C | C | C | C | C | C | C | C | B |
| | | | Color ink set 2 | C | C | C | C | C | C | C | C | C | C | B |
| | | | Color ink set 3 | C | C | C | C | C | C | C | C | C | C | B |
| | Evaluation 6 (water resistance of color image) | Condition 6 | Color ink set 1 | C | C | C | C | A | A | A | A | A | A | C |
| | | | Color ink set 2 | C | C | C | C | A | A | A | A | A | A | C |
| | | | Color ink set 3 | C | C | C | C | A | A | A | A | A | A | C |
| | Evaluation 7 (storage stability) | Condition 7 | | A | A | A | A | B | B | B | B | B | B | B |

| | | | | Comparative Examples | | | | | | | | |
|---|---|---|---|---|---|---|---|---|---|---|---|---|
| | | | | 32 | 33 | 34 | 35 | 36 | 37 | 38 | 39 | 40 |
| Composition of coating liquid | Oxazoline group-containing resin | WS700 | | | | | 36.0 | 36.0 | 36.0 | 36.0 | 36.0 | 45.0 |
| | Alkanediol having 7 or more carbon atoms | 1,2-OCD | | 1.5 | 1.5 | 1.5 | 1.5 | | | | | |
| | Alkanediol having less than 7 carbon atoms | 1,2-HED | | | | | | | | | | 1.5 |
| | Surfactant | Silicone-based Surf./hydrogen | | | 0.1 | | | 0.2 | | 0.1 | | 0.1 |
| | | Silicone-based Surf./methyl 1 | | 0.2 | 0.1 | | | | 0.2 | 0.1 | | 0.1 |
| | | Fluorine-based Surf. | | | | 0.2 | | | | | 0.2 | |
| | Other components | TPG | | | | | | | | | | |
| | | TEGmME | | | | | | | | | | |
| | | 3-M-1-B | | 6.0 | 6.0 | 6.0 | 6.0 | 6.0 | 6.0 | 6.0 | 6.0 | |
| | Resin | ff Resin | | 10.0 | 10.0 | 10.0 | 10.0 | 10.0 | 10.0 | 10.0 | 10.0 | 12.5 |
| | Deionized water | | | Balance | Balance | Balance | Balance | Balance | Balance | Balance | Balance | Balance |
| | Total | | | 100.0 | 100.0 | 100.0 | 100.0 | 100.0 | 100.0 | 100.0 | 100.0 | 100.0 |
| Evaluation test | Evaluation 1 (aggregation) | Condition 1A | | B | A | A | C | C | C | B | B | B |
| | | Condition 1B | | A | A | A | B | A | A | A | A | A |
| | Evaluation 2 (edge) | Condition 2A | | A | A | B | C | B | B | B | B | B |
| | | Condition 2B | | A | A | B | C | B | B | B | B | B |
| | Evaluation 3 (water resistance of coating layer) | Condition 3 | | C | C | C | A | A | A | A | A | A |
| | Evaluation 5 (receivability) | Condition 5A | Color ink set 1 | B | B | B | B | B | B | A | A | A |
| | | | Color ink set 2 | B | B | B | B | B | B | B | B | B |
| | | | Color ink set 3 | B | B | B | B | B | B | A | A | A |
| | | Condition 5B | Color ink set 1 | B | B | B | B | A | A | A | A | A |
| | | | Color ink set 2 | B | B | B | B | A | A | A | A | A |
| | | | Color ink set 3 | B | B | B | B | A | A | A | A | A |
| | | Condition 5C | Color ink set 1 | B | B | B | B | B | B | A | A | A |
| | | | Color ink set 2 | B | B | B | B | B | B | B | B | B |
| | | | Color ink set 3 | B | B | B | B | A | A | A | A | A |
| | Evaluation 6 of color image (water resistance) | Condition 6 | Color ink set 1 | C | C | C | A | A | A | A | A | A |
| | | | Color ink set 2 | C | C | C | A | A | A | A | A | A |
| | | | Color ink set 3 | C | C | C | A | A | A | A | A | A |
| | Evaluation 7 (storage stability) | Condition 7 | | B | B | B | B | B | B | B | B | B |

4.2. Preparation of Color Ink Composition

The components described in Table 8 were mixed and stirred to prepare a pigment dispersion, and the obtained pigment dispersion and the components described in Table 9 were mixed, stirred, and filtered through a 10-μm membrane filter, thereby preparing a color ink composition.

The color ink composition thus obtained was used as a color ink set with one set including a yellow ink composition (Y), a magenta ink composition (M), a cyan ink composition (C), a black ink composition (K), and a white ink composition (W).

Further, among the respective components in Tables 8 and 9, the components other than the components used in Tables 1 and 7 are as follows.

Pigment Yellow 180 (yellow pigment, volume average particle diameter of 120 nm)

Pigment Magenta 122 (magenta pigment, volume average particle diameter of 120 nm)

Pigment Blue 15:3 (cyan pigment, volume average particle diameter of 120 nm)

Pigment Black 7 (black pigment, volume average particle diameter of 120 nm)

Titanium oxide (white pigment, volume average particle diameter of 240 nm)

Styrene acrylic acid resin (weight average molecular weight of 16500, acid value of 240, Tg of 100° C.)

TABLE 8

|  | Dispersion 1 | Dispersion 2 | Dispersion 3 | Dispersion 4 | Dispersion 5 |
|---|---|---|---|---|---|
| Pigment Yellow 180 | 10.0 | | | | |
| Pigment Magenta 122 | | 10.0 | | | |
| Pigment Blue 15:3 | | | 10.0 | | |
| Pigment Black 7 | | | | 10.0 | |
| Titanium dioxide | | | | | 20.0 |
| Styrene acrylic acid resin | 3.0 | 3.0 | 3.0 | 3.0 | 3.0 |
| Pure water | Balance | Balance | Balance | Balance | Balance |
| Total | 100.0 | 100.0 | 100.0 | 100.0 | 100.0 | waveform (drive voltage or the like) for discharging the ink droplets was controlled to obtain a desired value of the average ink mass.

The recording conditions in Evaluations 1 to 4 are shown in Table 10, and the recording conditions in Evaluations 5 and 6 are shown in Table 11. Further, in all the evaluations, the vertical resolution×the horizontal resolution per injection (one pass) was set to 360×720 dpi. Further, the image resolution and the Duty in Tables 10 and 11 are expressed by the following formulae (6) and (7).

TABLE 9

| Composition of color ink | Color ink set 1 | | | | | Color ink set 2 | | | | | Color ink set 3 | | | | |
|---|---|---|---|---|---|---|---|---|---|---|---|---|---|---|---|
|  | Y1 | M1 | C1 | K1 | W1 | Y2 | M2 | C2 | K2 | W2 | Y3 | M3 | C3 | K3 | W3 |
| Dispersion 1 | 50.0 | | | | | 50.0 | | | | | 50.0 | | | | |
| Dispersion 2 | | 50.0 | | | | | 50.0 | | | | | 50.0 | | | |
| Dispersion 3 | | | 50.0 | | | | | 50.0 | | | | | 50.0 | | |
| Dispersion 4 | | | | 50.0 | | | | | 50.0 | | | | | 50.0 | |
| Dispersion 5 | | | | | 50.0 | | | | | 50.0 | | | | | 50.0 |
| 1,2-OCD | 1.5 | 1.5 | 1.5 | 1.5 | 1.5 | | | | | | 1.5 | 1.5 | 1.5 | 1.5 | 1.5 |
| 1,2-HED | | | | | | 1.5 | 1.5 | 1.5 | 1.5 | 1.5 | | | | | |
| TPG | 6.0 | 6.0 | 6.0 | 6.0 | 6.0 | | | | | | | | | | |
| TEGmME | | | | | | 6.0 | 6.0 | 6.0 | 6.0 | 6.0 | | | | | |
| 3-M-1-B | | | | | | | | | | | 6.0 | 6.0 | 6.0 | 6.0 | 6.0 |
| ff Resin | | | | | | | | | | | 12.5 | 12.5 | 12.5 | 12.5 | 12.5 |
| Silicone-based Surf./hydrogen | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Silicone-based Surf./methyl 1 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Pure water | Balance | Balance | Balance | Balance | Balance | Balance | Balance | Balance | Balance | Balance | Balance | Balance | Balance | Balance | Balance |
| Total | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |

4.3. Evaluation Tests

The coating liquid and the color ink composition, thus obtained, were charged into an ink cartridge of an ink jet printer (trade name "PX-G5100", manufactured by Seiko Epson Corporation).

Furthermore, when carrying out the following evaluation tests 1 to 6, first, the average ink mass of the discharged liquid droplets of the coating liquid and the ink composition discharged from the nozzle holes of the printer (which will be hereinafter simply referred to as an "average ink mass") was controlled. Specifically, the liquid droplets were discharged 10 times from the predetermined nozzles, and the ink mass was measured with a precision balance. The obtained measurement values were removed from the total number of the discharged ink droplets (multiplication of number of discharges per nozzle with number of nozzles) to calculate an average ink mass. Based on the obtained values, the discharge $$\text{Image resolution (dpi)} = (\text{vertical resolution} \times \text{horizontal resolution per injection}) \times (\text{number of injections}) \quad (6)$$

(in formula (6), the image resolution is a resolution per unit area).

Furthermore, Duty is defined by the following formula (7).

$$\text{Duty (\%)} = (\text{number of actually recorded dots})/(\text{image resolution}) \times 100 \quad (7)$$

(in formula (7), the term "number of actually recorded dots" refers to the number of dots actually recorded per unit area).

Furthermore, the average ink mass in Tables 10 and 11 was set in advance, based on the discharge conditions corresponding to an image at a Duty of 100% having an image resolution described in Tables 10 and 11. For example, in the condition 1A, the discharge waveform was controlled to give 3.63 mg/inch$^2$ (=720×720×7).

TABLE 10

| | | Coating liquid | | | |
|---|---|---|---|---|---|
| | | Number of injections (pass) | Image resolution (dpi) | Average ink mass (ng) | Duty (%) |
| Evaluation 1 (aggregation) | Condition 1A | 2 | 720 * 720 | 7 | 100 |
| | Condition 1B | 4 | 1440 * 720 | 3.5 | 100 |
| Evaluation 2 (Edge) | Condition 2A | 2 | 720 * 720 | 7 | 100 |
| | Condition 2B | 4 | 1440 * 720 | 3.5 | 100 |
| Evaluation 3 (Water resistance of coating layer) | Condition 3 | 2 | 720 * 720 | 7 | 100 |
| Evaluation 4 (Average dot diameter) | Condition 4 | 1 | 360 * 720 | 1.5~14 | 1 |

TABLE 11

| | | Coating liquid | | | | Color ink | | | |
|---|---|---|---|---|---|---|---|---|---|
| | | Number of injections (pass) | Image resolution (dpi) | Average ink mass (ng) | Duty (%) | Number of injections (pass) | Image resolution (dpi) | Average ink mass (ng) | Duty (%) |
| Evaluation 5 (Receivability) | Condition 5A | 2 | 720*720 | 7 | 100 | 2 | 720*720 | 7 | 100 |
| | Condition 5B | 4 | 1440*720 | 3.5 | 100 | 2 | 720*720 | 7 | 100 |
| | Condition 5C | 2 | 720*720 | 7 | 100 | 2 | 720*720 | 7 | 100 |
| Evaluation 6 (Water resistance of color image) | Condition 6 | 2 | 720*720 | 7 | 100 | 2 | 720*720 | 7 | 100 |

4.3.1. Evaluation Test for Coating Layer

1. Evaluation 1: Aggregation and Embedding

Using the printer, under the recording conditions of Conditions 1A and 1B, a solid image having a Duty of 100% (coating layer) was recorded on a recording medium (Lumirror S10 of a polyethylene terephthalate sheet manufactured by Toray Industries, Inc. and JT5829R of a vinyl chloride sheet manufactured by MACtac). Thus, the coating layers thus obtained were evaluated on generation of aggregation unevenness and streak unevenness. The evaluation criteria are as follows and the evaluation results are shown in Tables 1 to 7.

A: There is no occurrence of streaks due to poor aggregation and embedding
B: There is no aggregation, but there is occurrence of streaks due to poor embedding
C: There is occurrence of streaks due to poor aggregation and embedding 2. Evaluation 2: Positional Deviation of Dots (Deviation of Edge Portions)

Using the printer, under the recording conditions of Conditions 2A and 2B, a solid image having a Duty of 100% (coating layer) was recorded on a recording medium (Lumirror S10 of a polyethylene terephthalate sheet manufactured by Toray Industries, Inc. and JT5829R of a vinyl chloride sheet manufactured by MACtac). Thus, the coating layers thus obtained were evaluated on the positional deviation of the dots. The evaluation criteria are as follows and the evaluation results are shown in Tables 1 to 7.

A: Positional deviation of the dots in the periphery of the solid image is less than 5 μm (no deviation is observed)
B: Positional deviation of the dots in the periphery of the solid image is from 5 μm to less than 20 μm (deviation is observed)
C: Positional deviation of the dots in the periphery of the solid image is 20 μm or more (deviation is observed)

3. Evaluation 3: Water Resistance of Coating Layer

Using the printer, under the recording conditions of Condition 3, a solid image having a Duty of 100% (coating layer) was recorded on a recording medium (Lumirror S10 of a polyethylene terephthalate sheet manufactured by Toray Industries, Inc. and JT5829R of a vinyl chloride sheet manufactured by MACtac). The obtained recorded materials were dried by blowing air at 20° C. for 2 minutes, and the recorded materials were loaded onto a hot plate at 100° C. and heated for 15 minutes to obtain evaluation samples. Using an AB-301 COLOR FASTNESS RUBBING TESTER (manufactured by TESTER SANGYO., LTD.), 500 g of a load was set in cloth (calico) wet in water, and whenever rubbing with the number of times of friction 10, the water resistance was evaluated. The evaluation criteria were as follows and the evaluation results are shown in Tables 1 to 7.

A: Detachment of the recorded image (coating layer) is not seen even after rubbing 30 times
B: Detachment of the recorded image (coating layer) is not seen after rubbing 10 times, but is seen after rubbing 20 times
C: Detachment of the recorded image (coating layer) is seen after rubbing 10 times 4. Evaluation 4: Average Dot Diameter Using the printer, under the recording conditions of Condition 4, a solid image having a Duty of 1% (coating layer) was recorded on a recording medium (Lumirror S10 of a polyethylene terephthalate sheet manufactured by Toray Industries, Inc. and JT5829R of a vinyl chloride sheet manufactured by MACtac). 10 dots in the obtained recorded materials were imaged by an optical microscope and an average value of 10 dot areas was evaluated from the obtained images. The evaluation criteria were as follows and the evaluation results are shown in Table 12.

TABLE 12

| | Average ink mass (ng) | Examples 1 to 92 | Comparative Examples 1 to 5, Comparative Examples 11 to 15, Comparative Examples 21 to 25, Comparative Examples 31 to 35 | Comparative Examples 6 to 10, Comparative Examples 16 to 20, Comparative Examples 26 to 30, Comparative Examples 36 to 40 |
|---|---|---|---|---|
| Evaluation 4 (dot diameter; □μm) | 1.5 | 20 | 20 | 15 |
| | 2.0 | 25 | 25 | 20 |
| | 3.5 | 40 | 40 | 30 |
| | 7.0 | 80 | 80 | 60 |
| | 10.0 | 95 | 95 | 65 |
| | 14.0 | 110 | 110 | 70 |

4.3.2. Evaluation Tests for Color Image on Coating Layer
1. Evaluation 5: Receivability
Condition 5A Using the printer, under the recording conditions of Condition 5A, a solid image having a Duty of 100% (coating layer) was recorded on a recording medium (Lumirror S10 of a polyethylene terephthalate sheet manufactured by Toray Industries, Inc. and JT5829R of a vinyl chloride sheet manufactured by MACtac) under an environment at 20° C., and then dried with hot air at 35° C. for 10 minutes to obtain a first recorded material of the coating layer formed.

Then, using the printer on which the color ink sets 1 to 3 had been loaded, a monochromatic border pattern having a Duty of 100% was recorded under an environment at 20° C. on the first recorded material (coating layer) under the conditions of Condition 5A to obtain final evaluation samples. The evaluation criteria were as follows. Further, the evaluation results are shown in Tables 1 to 7.

A: Blurring of border of 6 pixels are not seen
B: Blurring of border of 6 pixels are seen
Condition 5B In the same manner as in Evaluation 5A except that the recording conditions for the coating liquid were changed to the recording conditions of Condition 5B, evaluation samples were obtained. The evaluation criteria were as follows. Further, the evaluation results are shown in Tables 1 to 7.

A: Blurring of border of 6 pixels are not seen
B: Blurring of border of 6 pixels are seen
Condition 5C (High-Speed Receivability)

In the same manner as in Evaluation 5A except that with regard to the drying conditions for obtaining the first recorded material, "drying with hot air at 35° C. for 10 minutes" was changed to "drying by blowing air at 20° C. for 2 minutes", evaluation samples were obtained. The evaluation criteria are as follows. Further, the evaluation results are shown in Tables 1 to 7.

A: Blurring of border of 6 pixels are not seen
B: Blurring of border of 6 pixels are seen
C: Since the coating layer is not sufficiently dried, the recording media are not transported appropriately, and thus, evaluation cannot be carried out 2. Evaluation 6: Water Resistance of Color Image Using the printer, under the recording conditions of Condition 6, a solid image having a Duty of 100% was recorded on a recording medium (Lumirror S10 of a polyethylene terephthalate sheet manufactured by Toray Industries, Inc. and JT5829R of a vinyl chloride sheet manufactured by MACtac) under an environment at 20° C., and then dried by blowing air at 20° C. for 2 minutes to obtain a first recorded material of the coating layer formed.

Then, using the printer on which the color ink sets 1 to 3 had been loaded, a color image having a Duty of 100% was recorded under an environment at 20° C. on the first recorded material (coating layer) under the conditions of Condition 6, and then the recorded material was transferred to and heated in a hot plate at 100° C. for 15 minutes to obtain final evaluation samples. Thereafter, using an AB-301 COLOR FASTNESS RUBBING TESTER (manufactured by TESTER SANGYO., LTD.), 500 g of a load was set in cloth (calico) wet in water, and whenever rubbing with the number of times of friction 10, the water resistance was evaluated. The evaluation criteria were as follows and the evaluation results are shown in Tables 1 to 7.

A: Detachment of the color image is not seen even after rubbing 30 times
B: Detachment of the color image is not seen after rubbing 10 times, but is seen after rubbing 20 times
C: Detachment of the color image is seen after rubbing 10 times 4.3.3. Evaluation Test for Storage Stability of Coating Liquid
1. Evaluation 7: Storage Stability For the respective coating liquids obtained above, the viscosity at 20° C. was measured and taken as an initial viscosity. Thereafter, 100 g of the respective coating liquids were charged into a 110-mL Laboran sample bottle (manufactured by Aspen Corporation), and subjected to a heating test while being tightly tapped. As for the conditions for the heating test, the coating liquids were heated at 70° C. and kept for one week. The respective coating liquids after the heating test were left to reach 20° C., and the viscosity at 20° C. was measured and taken as the viscosity after the heating test. For the respective coating liquids, the difference between the initial viscosity and the viscosity after the heating test (a change amount in the viscosity) was calculated, and the storage stability of the coating liquid was evaluated. The evaluation criteria are as follows and the evaluation results are shown in Tables 1 to 7.

A: The change in the viscosity is less than 0.2 mPas
B: The change in the viscosity is from 0.2 mPas to less than 0.4 mPas 4.4. Evaluation Results As seen from Tables 1 to 5, it was found that with the coating liquids according to Examples, an excellent coating layer having reduced aggregation unevenness and streak unevenness can be formed.

Furthermore, as seen from Table 12, it was found that according to the coating liquids according to Examples, there is a high correlation between the average ink mass and the dot diameter. Thus, it could be seen that when the coating liquids according to Example were used, by increasing the average ink mass even with a small number of passes at the time of recording the coating layer, the recording medium could be coated well and thus, the recording speed could be increased.

Furthermore, it was found that the coating layers formed with the coating liquids according to the Examples had good color ink receivability, and the water resistance of the color image could be improved. Further, in Examples 1 to 4, 21 to 28, and 29 to 40, it was found that when the coating layer and the color image could be formed under an environment at 20° C., a drying unit having a warming function was not necessary, and therefore, it is possible to simplify the apparatus.

Further, for the compositions of the coating liquids of Examples 1 to 8, 13 to 16, 21 to 24, and 29 to 40, even when 1,2-octanediol was changed to 1,2-heptanediol, the evaluation results of the corresponding Examples were the same (Examples 41 to 68).

On the other hand, it was found that the coating liquids having no oxazoline group-containing resin among the coating liquids of Comparative Examples tended to have low color ink receivability and low water resistance of the color image.

Furthermore, with the coating liquids having no surfactant among the coating liquids of Comparative Examples, a coating layer, in which aggregation unevenness, streak unevenness, and deviation of an edge portion occur, were recorded. Further, the color ink receivability was not also good.

Furthermore, with the coating liquids containing alkanediols having 7 or more carbon atoms among the coating liquids of Comparative Examples, aggregation unevenness or streak unevenness tended to occur with a small number of passes and a coating layer with deviation of edge portions occurred was recorded. As such, it is presumed that as apparent from Table 12, there is a low correlation between the average ink mass and the dot diameter, as compared with a case of those containing alkanediols having 7 or more carbon atoms. That is, since the coating liquid is "repellent" on the recording medium, good fixability cannot be obtained.

Furthermore, it was found that among the coating liquids of Examples, the amounts of change in the viscosity of the coating liquids of Examples 69 to 92, including neutralizing agents, were all less than 0.2 mPas and the deviation of the landing position of the ink droplets due to the viscosity change in the coating liquid became very low. Further, the amounts of change in the viscosity of the coating liquids of Examples 1 to 8, 13 to 16, 21 to 24, and 29 to 40 were larger than those in the viscosity of Examples 69 to 92, and this is not problematic in practical use.

The invention is not limited to the embodiments as described above, but various modifications can be made. For example, the invention includes substantially the same constitutions (for example, a constitution having the same functions, methods, and results, or a constitution having the same purposes and effects) as those described in the embodiments. Further, the invention includes a constitution having a substitution of a part that is not essential in the constitution described in the embodiments. Further, the invention includes a constitution for obtaining the same operation effect as the constitution described in the embodiments or constitution for obtaining the same purpose as the constitution described in the embodiments. In addition, the invention includes a constitution with the addition of known technologies to the constitution described in the embodiments.

What is claimed is:

1. A coating liquid comprising:
an oxazoline group-containing resin;
an alkanediol having 7 or more carbon atoms;
a surfactant; and
water,
wherein the weight average molecular weight of the oxazoline group-containing resin is from 20000 to 120000.

2. The coating liquid according to claim 1, further comprising a carboxyl group-containing resin.

3. A coating liquid comprising:
an oxazoline group-containing resin;
an alkanediol having 7 or more carbon atoms;
a surfactant;
water; and
a carboxyl group-containing resin
wherein the ratio (MA/MB) of the number of moles (MA) of oxazoline groups in the total mass of the oxazoline group-containing resin to the number of moles (MB) of carboxyl groups in the total mass of the carboxyl group-containing resin is from 10 to 40.

4. The coating liquid according to claim 1,
wherein the alkanediol having 7 or more carbon atoms is at least one selected from the group consisting of 1,2-heptanediol, 1,2-octanediol, 4,4-dimethyl-1,2-pentanediol, 5-methyl-1,2-hexanediol, and 4-methyl-1,2-hexanediol.

5. The coating liquid according to claim 1,
wherein the surfactant is at least one of a polyorganosiloxane-based surfactant and a fluorine-based surfactant.

6. The coating liquid according to claim 1, further comprising at least one of oxyalkylene glycols and glycol ethers.

7. An ink jet recording method using an ink jet recording apparatus having a head, in which the head is equipped with nozzle rows including a plurality of nozzle holes, the method comprising:
discharging liquid droplets of the coating liquid according to claim 1 from the nozzle holes;
attaching the liquid droplets onto a recording medium to form dots including the liquid droplets; and
repeating the discharging and the attaching plural times to form a coating layer on the recording medium.

8. An ink jet recording method using an ink jet recording apparatus having a head, in which the head is equipped with nozzle rows including a plurality of nozzle holes, and the method comprising:
discharging liquid droplets of the coating liquid for ink jet according to claim 2 from the nozzle holes;
attaching the liquid droplets onto a recording medium to form dots including the liquid droplets; and
repeating the discharging and the attaching plural times to form a coating layer on the recording medium.

9. An ink jet recording method using an ink jet recording apparatus having a head, in which the head is equipped with nozzle rows including a plurality of nozzle holes, and the method comprising:
discharging liquid droplets of the coating liquid for ink jet according to claim 3 from the nozzle holes;
attaching the liquid droplets onto a recording medium to form dots including the liquid droplets; and
repeating the discharging and the attaching plural times to form a coating layer on the recording medium.

10. An ink jet recording method using an ink jet recording apparatus having a head, in which the head is equipped with nozzle rows including a plurality of nozzle holes, and the method comprising:
discharging liquid droplets of the coating liquid for ink jet according to claim 4 from the nozzle holes;
attaching the liquid droplets onto a recording medium to form dots including the liquid droplets; and
repeating the discharging and the attaching plural times to form a coating layer on the recording medium.

11. An ink jet recording method using an ink jet recording apparatus having a head, in which the head is equipped with nozzle rows including a plurality of nozzle holes, and the method comprising:
discharging liquid droplets of the coating liquid for ink jet according to claim 5 from the nozzle holes;
attaching the liquid droplets onto a recording medium to form dots including the liquid droplets; and
repeating the discharging and the attaching plural times to form a coating layer on the recording medium.

12. An ink jet recording method using an ink jet recording apparatus having a head, in which the head is equipped with nozzle rows including a plurality of nozzle holes, and the method comprising:
discharging liquid droplets of the coating liquid for ink jet according to claim 6 from the nozzle holes;
attaching the liquid droplets onto a recording medium to form dots including the liquid droplets; and
repeating the discharging and the attaching plural times to form a coating layer on the recording medium.

13. The ink jet recording method according to claim 7,
wherein a plurality of nozzle rows are aligned;
the coating layer formed in the repeating above has a dot interval with an image resolution of 300 dpi or more in the alignment direction of the nozzle rows;
the mass of the liquid droplets discharged in the discharging is from 1 ng to 15 ng; and
the diameter of the dots formed in the attaching is larger than the dot interval.

14. The ink jet recording method according to claim 7, further comprising:

discharging liquid droplets of a color ink composition including a colorant and water from the nozzle holes; and attaching the liquid droplets onto the coating layer to form a color image.

15. The ink jet recording method according to claim 7, further comprising drying the recording medium.

16. The ink jet recording method according to claim 7, wherein the coating layer is formed on the entire surface of the recording medium in the repeating.

17. The ink jet recording method according to claim 7, wherein the recording medium is a low-ink-absorbing or non-ink-absorbing recording medium.

* * * * *